United States Patent
Tabet et al.

(10) Patent No.: US 9,408,144 B2
(45) Date of Patent: Aug. 2, 2016

(54) SHORTENED HARQ TIMELINES FOR LOW BANDWIDTH APPLICATIONS

(71) Applicant: Apple Inc., Cupertino, CA (US)

(72) Inventors: Tarik Tabet, Los Gatos, CA (US); Vinay R. Majjigi, Sunnyvale, CA (US); Christian W. Mucke, Sunnyvale, CA (US); Syed A. Mujtaba, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 14/074,204

(22) Filed: Nov. 7, 2013

(65) Prior Publication Data

US 2015/0124671 A1    May 7, 2015

(51) Int. Cl.
*G08C 17/00* (2006.01)
*H04W 52/02* (2009.01)
*H04L 1/18* (2006.01)

(52) U.S. Cl.
CPC .......... *H04W 52/0216* (2013.01); *H04L 1/1887* (2013.01); *H04W 52/0251* (2013.01)

(58) Field of Classification Search
CPC .................................. H04L 1/18; H04L 5/00
See application file for complete search history.

(56) References Cited

U.S. PATENT DOCUMENTS

2009/0016265 A1*  1/2009  Katayama et al. ............ 370/328
2013/0051272 A1    2/2013  Wiberg et al.
2014/0362832 A1*  12/2014  Rudolf et al. ................ 370/336

OTHER PUBLICATIONS

Sayana et al., "Link Performance Abstraction based on Mean Mutual Information per Bit (MMIB) of the LLR Channel," IEEE 802.16 Broadband Wireless Access Working Group <http://ieee802.org/16> ; Published at HTTP://WIRELESSMAN.ORG/TGM/CONTRIB on Feb. 12, 2009, According to waybackmachine at HTTPS://Web.Archive.org.

* cited by examiner

*Primary Examiner* — Chi H Pham
*Assistant Examiner* — Fahmida Chowdhury
(74) *Attorney, Agent, or Firm* — Downey Brand LLP

(57) ABSTRACT

Apparatus and methods for performing reduced hybrid automatic repeat request (HARQ) operations for a user equipment (UE) during a data communications session, e.g., for voice over LTE (VoLTE) communications. The UE can initially inform the network, via an enhanced NodeB (eNodeB), that the UE is capable of performing advanced HARQ functions. The eNodeB can further evaluate various network conditions to determine when reduced HARQ operations should be employed. When network conditions allow, the eNodeB can transmit an RRC message to the UE, including reduced HARQ timeline configuration information. Thereafter, the UE and the eNodeB can collaborate to institute the reduced HARQ timeline to schedule an application data retransmission during the data communications session. The reduced HARQ operations can be performed in conjunction with various semi-persistent scheduling (SPS) and connected mode discontinuous reception (C-DRX) operations, to further conserve UE device resources.

20 Claims, 15 Drawing Sheets

SHORTENED HARQ TIMELINES FOR LOW BANDWIDTH APPLICATIONS

FIELD

The described embodiments generally relate to wireless communications and more particularly to procedures for mitigating problems associated with hybrid automatic repeat request (HARQ) scheduling that result in unnecessary power consumption at user equipment.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced (LTE-A) standards are rapidly being developed and deployed within the United States and abroad. LTE-A brings with it the aggregation of multiple component carriers (CCs) to enable this wireless communications standard to meet the bandwidth requirements of multi-carrier systems that cumulatively achieve data rates not possible by predecessor LTE versions.

One mechanism common to LTE and LTE-A, which allows these 4G telecommunication standards to reliably achieve high data rate throughputs is the Hybrid Automatic Repeat Request (Hybrid ARQ or HARQ). LTE HARQ processes are achieved through the collaboration of an LTE base station, i.e., an enhanced NodeB or eNodeB, and a wireless mobile communication device, i.e., a user equipment or UE, at a time when error packets or transmission errors are received by a UE in the downlink (DL), or at a time when error packets or transmission errors are received by an eNodeB in the uplink (UL).

Hybrid ARQ is a combination of high-rate forward error correction (FEC) coding and ARQ error control. In standard ARQ, redundant bits can be added to data to be transmitted to a receiver using an error detecting code such as a cyclic redundancy check (CRC). Receivers detecting a corrupted message can thereby request a new message from the sender. However, in HARQ, transmission data can be encoded with FEC code, where corresponding parity bits are sent with the transmission data. Alternatively, corresponding parity bits may be transmitted at a subsequent time, upon request, when a receiver detects an erroneous transmission.

Further, LTE communications can also employ connected mode discontinuous reception (C-DRX) operations and semi-persistent scheduling (SPS) to allow 4G LTE enabled UEs to conserve local device resources (e.g., battery power, processing power, available memory, etc.) during various radio resource control (RRC) Connected mode operations, such as when a UE is engaged in low bandwidth application data communications, e.g., during periodic voice over LTE (VoLTE) commutations. However, the power conservation benefits of C-DRX and SPS operations can be compromised by overlaying HARQ retransmissions thereon, which requires a UE to remain awake for extended periods of time in order for the UE to be able to transmit/receive HARQ acknowledgement (ACK/NACK) messages and then process corresponding DL or UL HARQ retransmissions.

For certain low bandwidth application data communications, such as VoLTE-type data commutations, network-designated LTE HARQ timelines can be overly conservative in their timing requirements, which may result in a UE remaining awake for longer periods of time than necessary. Accordingly, there exists a need for solutions that can conserve local UE device resources by reducing DL an UL HARQ timelines that necessitate a UE remaining active during time periods when the UE could otherwise enter into a C-DRX or an SPS power saving mode.

SUMMARY

Apparatus and methods for performing reduced hybrid automatic repeat request (HARQ) operations for a user equipment (UE) during a data communications session. The UE can initially inform the network that it is capable of performing advanced HARQ functions. The network can also evaluate various network conditions to determine when reduced HARQ operations should be employed. When network conditions allow, e.g., when an application data of the data communications session is determined to be low-bandwidth data, a network base station can transmit an RRC message to the UE, including reduced HARQ timeline configuration information. Thereafter, the UE and the network base station can collaborate to institute the reduced HARQ timeline to schedule at least one data retransmission during the data communications session, in the downlink or in the uplink.

In accordance with some aspects of the disclosure, the UE can be a long term evolution (LTE) compliant wireless communication device, and application data determined to be low-bandwidth data can be voice over LTE (VoLTE) data.

In one scenario, the HARQ retransmission can be scheduled in response to receiving a HARQ NACK message from the UE via a physical uplink control channel (PUCCH) for downlink application data communications.

In another scenario, the HARQ retransmission can be scheduled in response to receiving the HARQ NACK message from an enhanced NodeB (eNodeB) base station via a physical hybrid ARQ indicator channel (PHICH) for uplink application data communications.

In accordance with another aspect, the reduced HARQ timeline can be generated at a network device to have a round trip time (RTT) that is less than 8 milliseconds in duration. In some implementations, the reduced HARQ timeline can have a RTT that that is 6 ms. or 4 ms. in duration.

In various implementations, the reduced HARQ timeline can be associated with a reduced UE HARQ processing time or a reduced network base station HARQ processing time, and the reduced HARQ operations can be associated with fewer HARQ processes being required to retransmit a portion of the application data that is communicated as part of the data communications session using the reduced HARQ timeline.

In accordance with one aspect of the disclosure, the reduced HARQ operations can be synchronous HARQ operations that are performed for downlink communications between an enhanced NodeB (eNodeB) and the UE during the data communications session.

In another aspect, the reduced HARQ operations may be performed in conjunction with various semi-persistent scheduling (SPS) operations, or in conjunction with various connected mode discontinuous reception (C-DRX) operations.

In some aspects, instituting the reduced HARQ timeline can include receiving a radio resource control (RRC) message from the UE having an indication that the UE can perform advanced HARQ functions in accordance with the reduced HARQ timeline, and then transmitting reduced HARQ timeline configuration information to the UE in an RRC configuration message or in an RRC reconfiguration message.

In accordance with another aspect of the disclosure, a method of reducing hybrid automatic repeat request (HARQ) operations for a user equipment (UE) during a data communications session can include instituting a reduced HARQ timeline for the UE, receiving a HARQ negative acknowledgement (NACK) message that identifies a data transmission error during the data communications session, and retransmitting data associated with the data transmission error using the reduced HARQ timeline. In various implementations, the reduced HARQ timeline can be employed to minimize a number of HARQ operations required to acquire the data associated with data transmission error.

In some aspects, the reduced HARQ timeline can be generated by a network device and instituted by the UE for downlink application data communications or for uplink application data communications of the data communications session.

In accordance with another aspect, the reduced HARQ timeline can be associated with a reduced UE HARQ processing time or a reduced network base station HARQ processing time.

In accordance with another aspect of the disclosure, a procedure of establishing a reduced hybrid automatic repeat request (HARQ) timeline for communications with a user equipment (UE) can include receiving a message from the UE indicating the HARQ capability of the UE, determining whether the UE is able to perform advanced HARQ functions, evaluating one or more network conditions to determine whether to activate a reduced HARQ timeline for the UE in response to determining that the UE can perform advanced HARQ functions, and then transmitting reduced HARQ timeline configuration information to the UE in response to determining that the network conditions warrant activation of the reduced HARQ timeline.

In one aspect, the message from the UE indicating the HARQ capability of the UE is a radio resource control (RRC) message comprising an evolved UMTS terrestrial radio access (E-UTRA) capability of the UE and/or one or more RRC connected mode feature group indicators (FGIs).

In accordance with some implementations, the one or more network conditions may comprise an application data type, a quality of service (QoS) requirement, and/or a historical network traffic pattern.

In another aspect, the reduced HARQ timeline configuration information can comprise a reduced HARQ timeline round trip time (RTT), a number of required HARQ processes, and/or a network delay time.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for scheduling and implementing improved LTE downlink (DL) and LTE uplink (UL) hybrid automatic repeat request (HARQ) timelines, for respectively performing reduced HARQ operations in the DL and reduced HARQ operations in the UL, are described within this section. Further, various examples for performing predictive HARQ retransmissions, are also described herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments, the term "user equipment" may be used herein to describe one or any number of common consumer electronic communication devices, including, but not limited to: cellular phones or smart phones, tablet computers, laptop computers or netbook computers, media player devices, electronic book devices, MiFi® devices, as well as any other type of electronic computing device having fourth generation (4G) Long Term Evolution (LTE) or LTE Advanced (LTE-A) communication capabilities. In various scenarios, these capabilities may allow a respective UE to communicate within a 4G network cell that employs any common type of LTE or LTE-A radio access technology (RAT).

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1:
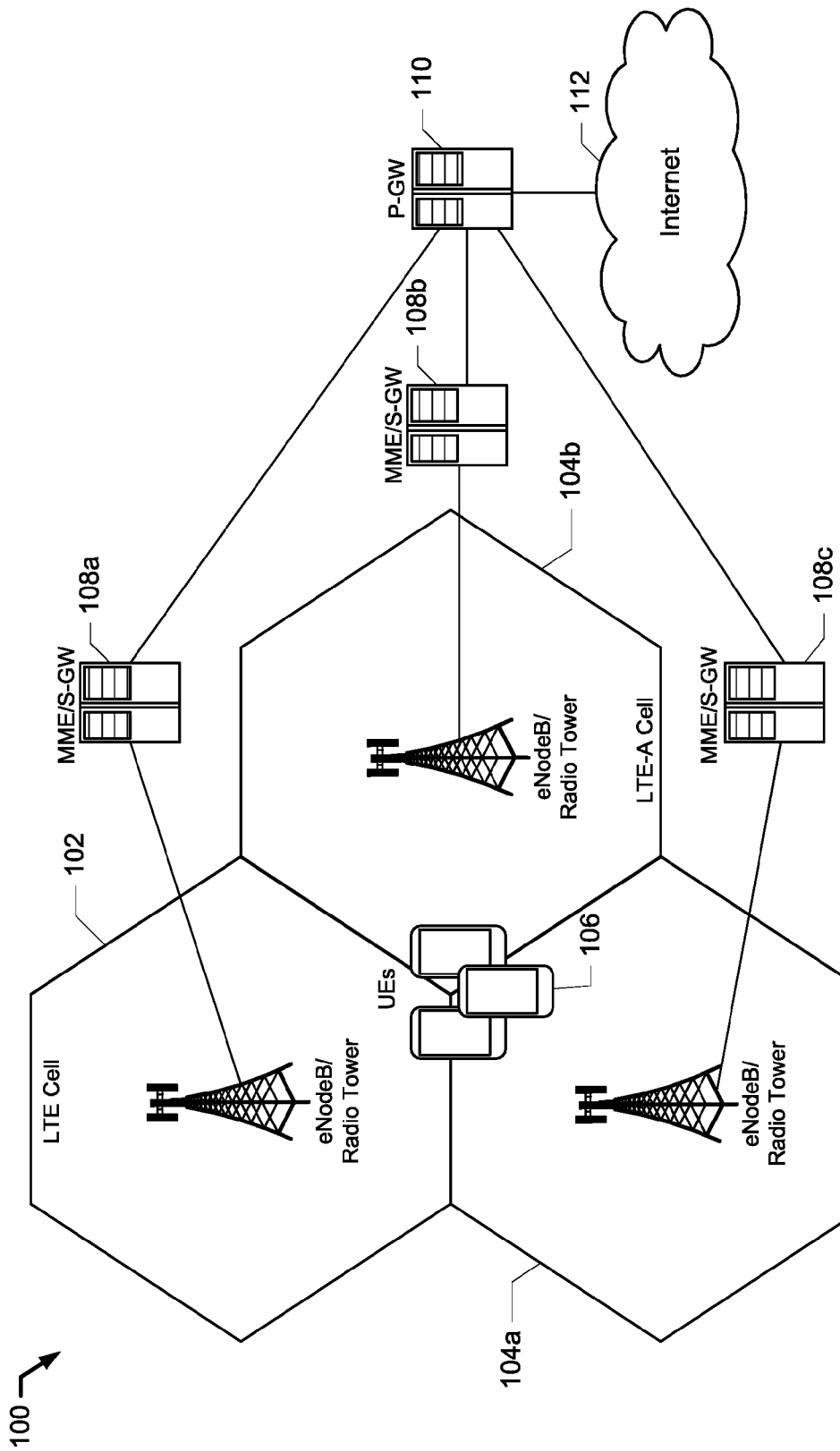
FIG. 1 shows a wireless communication system including Long Term Evolution (LTE) and LTE Advanced (LTE-A) network cells supporting multiple user equipment devices (UEs) that may be configured to employ advanced hybrid automatic repeat request (HARQ) functions, in accordance with some embodiments of the disclosure.

FIG. 1 depicts a wireless communication system 100 that is compliant with the 3GPP Evolved Universal Terrestrial Radio Access (E-UTRA) air interface, and includes, but is not limited to, one LTE network cell 102 and two LTE-A network cells 104a-b, respectively having enhanced NodeB (eNodeB) base stations (e.g., depicted as radio towers) that can communication between and amongst each other via an X2 interface. Further, the E-UTRA compliant communication system 100 can include any number of mobility management entities (MMEs) 108a-c, serving gateways (S-GWs) 108a-c, PDN gateways (P-GWs) 110, etc., which, as part of the evolved packet core (EPC), can communicate with any of the LTE and LTE-A cell eNodeBs, 102 and 104a-b, via an S1 interface. Additionally, the EUTRA communication system 100 can include any number of UEs that may be provided wireless communications service by one or more of the eNodeBs of the LTE and LTE-A cells, 102 and 104a-b, at any particular time.

By way of example, a UE 106 may be located within an LTE-A cell 104a-b and in an LTE radio resource control (RRC) Connected mode when it initiates a voice over LTE (VoLTE) application to establish a voice call. The UE 106 running the VoLTE application can place a VoLTE voice call to an intended recipient by communicating voice data to a serving eNodeB 104a-b, which forwards the call through the EPC, 108a-c and 110, and thereby connects to the Internet 112 to transfer the VoLTE communications through an IP Multimedia Subsystem (IMS) network between the caller UE 106 and a receiving device of the intended recipient, which may be a part of a remote network. Alternatively, the UE 106 can initiate any number of different UE-resident applications that may be respectively associated with a particular data type, e.g., streaming audio data, streaming audio-video data, website data, text data, etc., to attempt to transfer IP-based application data via its serving LTE network 104a-b over the Internet 112.

Depending on the data type of a corresponding UE application, a network resource requirement (e.g., associated with network resource blocks or RBs) for communicating the application data may be minimal (e.g., for text or voice data), moderate (e.g., for website webpage data), or substantial (e.g., for streaming audio-video data). Consequently, in some embodiments, a first UE application may be associated with a low-bandwidth data type (e.g., VoLTE-type data); whereas, in other embodiments, a second UE application may be associated with a moderate to high-bandwidth data type (e.g., streaming audio or video data). In some implementations, improved LTE DL HARQ timelines and/or improved LTE UL HARQ timelines can be employed based on one or more UE application data types being communicated between a UE 102 and an eNodeB of an LTE or an LTE-A cell, 102 and 104a-b, at a time when the UE 102 or the eNodeB receives a corresponding error packet or transmission error.

In various embodiments, the improved DL HARQ timelines and/or the improved UL HARQ timelines can be employed in such a manner to substantially mitigate problems associated with unnecessary power consumption at a UE 106. This unnecessary power consumption can occur when the UE 106 attempts to monitor various LTE control channels and/or decode various LTE communication channels for UL or DL HARQ control information and transmissions or retransmission during an RRC Connected mode, based on a duty cycle associated with a particular UE application.

These LTE control and communications channels may include, but are not limited to: the physical downlink control channel (PDCCH), the physical uplink control channel (PUCCH), the physical downlink shared channel (PDSCH), the physical uplink shared channel (PUSCH), the physical hybrid ARQ indicator channel (PHICH), etc. As will be described further herein, LTE HARQ procedures can occur in conjunction with one or more connected mode discontinuous reception (C-DRX) operations and/or in conjunction with one or more semi-persistent scheduling (SPS) operations.

Figure 2:
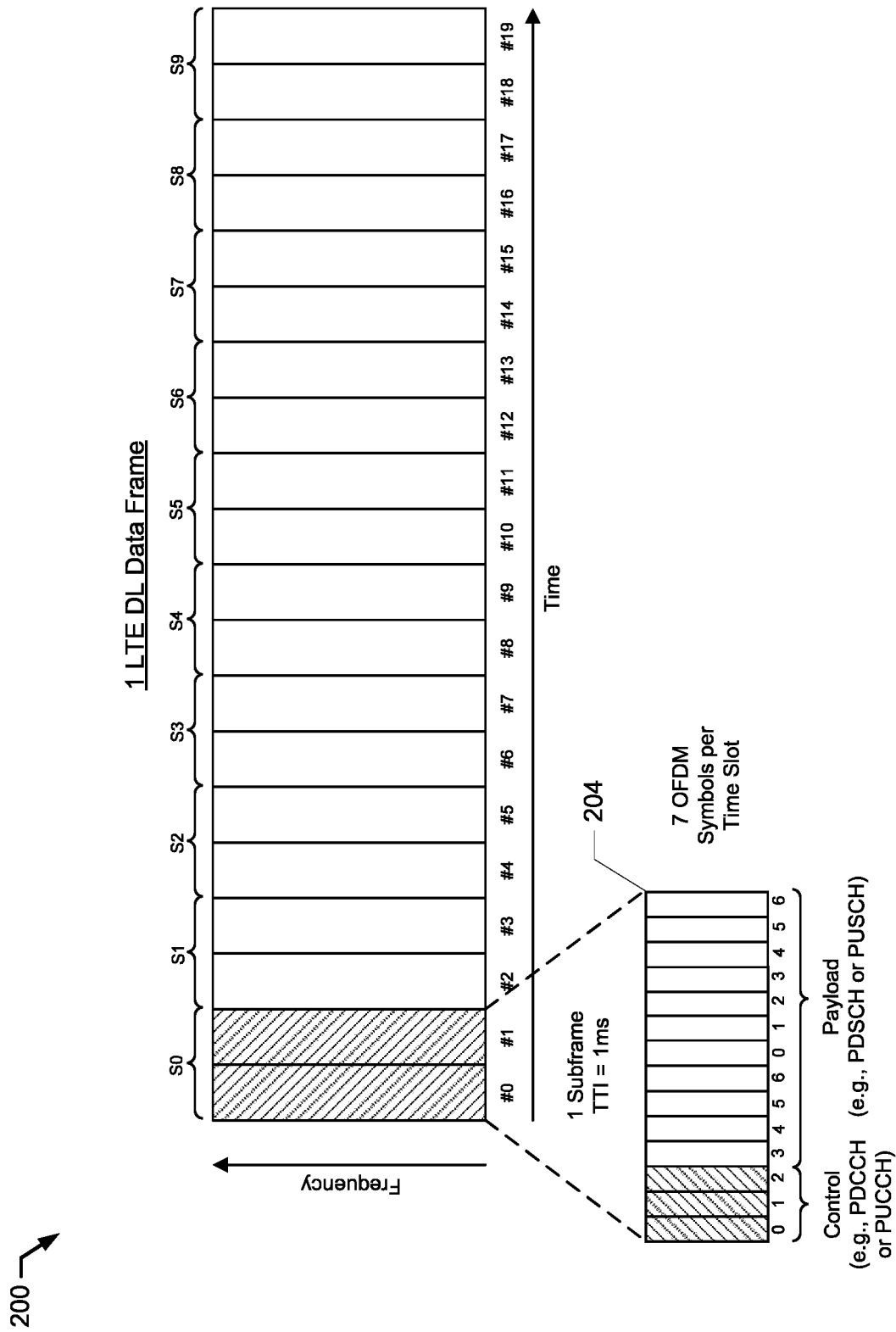
FIG. 2 shows a block diagram depicting a single LTE data frame structure, in accordance with various implementations of the disclosure.

FIG. 2 illustrates a block diagram 200 depicting a single LTE data frame structure 202 in accordance with various implementations of the disclosure. As would be understood by those skilled in the art, one LTE data frame 202 includes 10 subframes, labeled S0 through S9, respectively having a transmission time interval (TTI) of 1 ms. each. Each LTE subframe is composed of two time slots having a TTI of 0.5 ms. each. Accordingly, there are 20 time slots, labeled #0 through #19, within each LTE data frame 202. For instance, the first subframe S0 204 of the LTE data frame 202 may be composed of 14 orthogonal frequency division multiplexing (OFDM) symbols, which equates to 7 OFDM symbols per time slot, #0 and #1, of subframe S0 204.

A first portion of the OFDM symbols (e.g., the first three OFDM symbols) of subframe S0 204 may be designated for control signaling information (e.g., control information associated with the PDCCH, the PUCCH, the PHICH, etc.), and the remaining portion of the OFDM symbols of subframe S0 204 may be designated for payload data (e.g., payload data associated with the PDSCH or the PUSCH). It should be understood that the number of OFDM symbols in each of the LTE subframes, S0 through S9, can vary depending on a length of a corresponding cyclic prefix (CP). The CP can be transmitted before each OFDM symbol in each subcarrier in the time domain to prevent inter-symbol interference (ISI) due to multipath.

In LTE, the CP may correspond to either a normal CP having a duration of 5 μs., or an extended CP having a duration of 17 μs. Therefore, an LTE slot employing a normal CP will typically have 7 OFDM symbols; whereas an LTE slot employing an extended CP (e.g., intended for use in larger suburban cells) will typically have 6 OFDM symbols. An LTE resource block (RB) is typically associated with 12 OFDM subcarriers transmitting for the duration of one LTE slot. Accordingly, a normal RB (associated with a normal CP) transmitting for 0.5 ms. will comprise 84 OFDM symbols (12 subcarriers×7 OFDM symbols) or resource elements (REs). Likewise, an extended RB (associated with an extended CP) transmitting for 0.5 ms. will comprise 72 REs (12 subcarriers×6 OFDM symbols).

In various embodiments, an LTE-A cell 104a-b may employ multiple component carriers (CCs), in aggregate, to achieve cumulative bandwidths of up to 100 MHz within various allocated network spectrum bands. A corresponding LTE-A cell may comprise an eNodeB that can designate a PDCCH format or a PUCCH format according to its respective control information, which can be directed at a single UE 106 or multiple UEs 106 residing within the same network cell 104a-b. By way of example, PDCCH DCI may be associated with a cell radio network temporary identifier (C-RNTI) directed at a single UE 106, or alternatively, PDCCH DCI may be associated with a paging RNTI (P-RNTI) or a system information RNTI (SI-RNTI) directed at a group of UEs 106 located within the same cell 104a-b. In various embodiments, the DCI of a PDCCH may include downlink (DL) grant information (e.g., resource allocations of the PDSCH), as well as, uplink resource grant information (e.g., resource allocations of the PUSCH), Tx power control information, etc.

Figure 3:
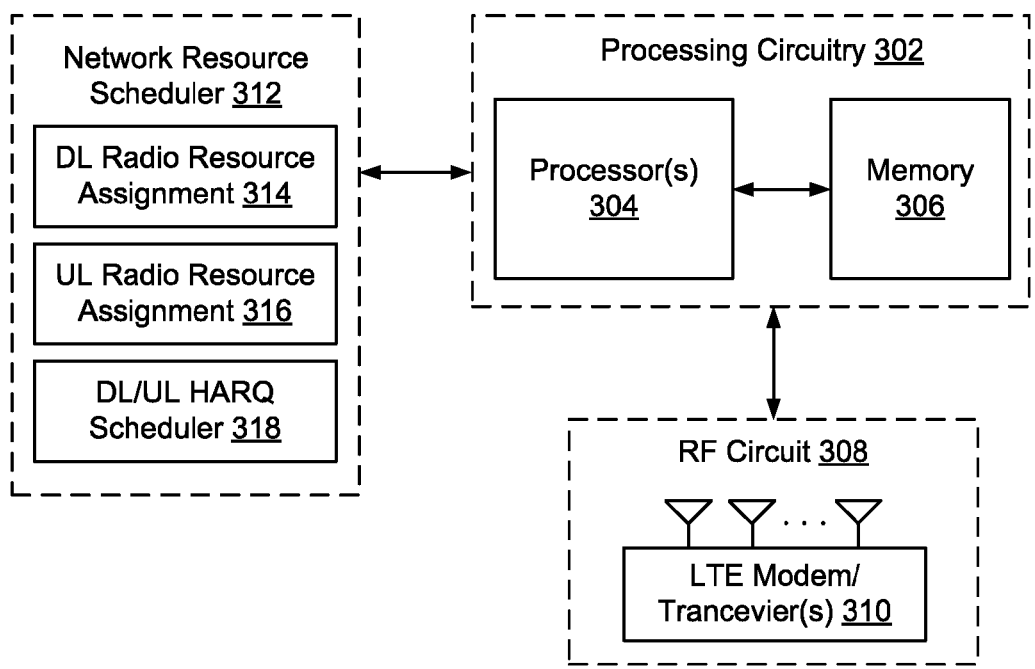
FIG. 3 shows a block diagram of a network apparatus including a network resource scheduler having a downlink (DL) radio resource assignment component, an uplink (UL) radio resource assignment component, and an DL/UL HARQ scheduler component, in accordance with some embodiments.

FIG. 3 illustrates a block diagram of a network apparatus 300 (e.g., an LTE eNodeB having RRC functionality) with a network resource scheduler 312 having a DL radio resource assignment component 314, an UL radio resource assignment component 316, and a DL/UL HARQ scheduler 318, in accordance with various embodiments of the disclosure. In some implementations, the network resource scheduler 312 can be configured to utilize its DL radio resource assignment component 314 to generate and/or issue various DL radio resource assignments (e.g., carrier DL RB grants) to one or more UEs 106 located within its corresponding network cells (e.g., within an LTE cell 102 or within an LTE-A cell 104a-b).

In other situations, the network resource scheduler 312 can also be configured to utilize its UL radio resource assignment component 314 to generate and/or issue various UL radio resource assignments (e.g., carrier UL RB grants) to one or more UEs 106 located within its corresponding network cells (e.g., within an LTE cell 102 or within an LTE-A cell 104a-b). In this context, the network resource scheduler 312 of the network apparatus 300 may be able to determine which UEs 106 should receive PDCCH, PUCCH, PDSCH, PUSCH, and PHICH HARQ transmissions, and on what RBs these HARQ transmissions should be received during a respective TTI in the DL or in the UL.

Further, the network resource scheduler 312 of the network apparatus 300 may also include a DL/UL HARQ scheduler 318 component that can be configured to schedule and/or implement various improved DL HARQ timelines for performing reduced HARQ operations in the DL, as well as, various improved UL HARQ timelines for performing reduced HARQ operations in the UL. The functionality of DL/UL HARQ scheduler 318 will be described further herein with respect to the subject matter of FIGS. 5-14. Accordingly, one skilled in the art would be able to readily discern which HARQ scheduling processes may be carried out by the network apparatus 300 (e.g., an eNodeB having RRC functionality) acting alone, as well as, which DL HARQ implementations and which UL HARQ implementations can be carried out by the network apparatus 300 acting in tandem with one or more UEs 106.

In some configurations, the network apparatus 300 can include processing circuitry 302 that can perform various HARQ resource scheduling actions in accordance with one or more embodiments disclosed herein. In this regard, the processing circuitry 302 can be configured to perform and/or control performance of one or more functionalities of the network apparatus 300 in accordance with various implementations, and thus can provide functionality for performing reduced HARQ operations in the DL, reduced HARQ operations in the UL, and other communication procedures of the network apparatus 300 in accordance with various embodiments. The processing circuitry 302 may further be configured to perform data processing, application execution and/or other control and management functions according to one or more embodiments of the disclosure.

The network apparatus 300 or portions or components thereof, such as the processing circuitry 302, can include one or more chipsets, which can respectively include any number of coupled microchips thereon. The processing circuitry 302 and/or one or more other components of the network apparatus 300 may also be configured to implement functions associated with various reduced HARQ operations in the DL and various reduced HARQ operations in the UL, in accordance with various embodiments of the disclosure using multiple chipsets. In some scenarios, the network apparatus 300 may be associated with or employed as an eNodeB of an LTE 102 or an LTE-A cell 104a-b to operate within the wireless communication system 100 of FIG. 1. In this implementation, the network apparatus 300 may include one or more chipsets configured to enable the apparatus to operate within the wireless communication system 100 as a network base station, providing wireless communications service to any number of UEs 106 located within its corresponding wireless coverage area.

In some scenarios, the processing circuitry 302 of the network apparatus 300 may include one or more processor(s) 304 and a memory component 306. The processing circuitry 302 may be in communication with, or otherwise coupled to, a radio frequency (RF) circuit 308 having an LTE compliant modem and one or more wireless communication transceivers 310. In some implementations, the RF circuit 308 including the modem and the one or more transceivers 310 may be configured to communicate using different LTE RAT types. For instance, in some embodiments the RF circuit 308 may be configured to communicate using an LTE RAT, and in other embodiments, the RF circuit 308 may be configured to communicate using an LTE-A RAT.

In various implementations, the processor(s) 304 may be configured and/or employed in a variety of different forms. For example, the processor(s) 304 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 304 can be coupled to and/or configured in operative communication with each other and these components may be collectively configured to perform one or more procedures of the network apparatus 300 as described herein in the form of an eNodeB having RRC control functionality.

In some scenarios, the processors 304 can be configured to execute instructions that may be stored in the memory 306 or that can be otherwise accessible to the processors 304 in some other device memory. As such, whether configured as, or in conjunction with, hardware or a combination of hardware and software, the processors 304 of the processing circuitry 302 may be capable of performing operations according to various implementations described herein when configured accordingly.

In various embodiments, the memory 306 of the processing circuitry 302 may include multiple memory devices that can be associated with any common volatile or non-volatile memory type. In some scenarios, the memory 306 may be associated with a non-transitory computer-readable storage medium that can store various computer program instructions which may be executed by the processor(s) 304 during normal program executions. In this regard, the memory 306 can be configured to store information, data, applications, instructions, or the like, for enabling the network apparatus 300 to carry out various functions in accordance with one or more embodiments of the disclosure. In some implementations, the memory 306 may be in communication with, and coupled to, the processor(s) 304 of the processing circuitry 302, as well as one or more system buses for passing information between and amongst the different device components of the network apparatus 300.

It should be appreciated that not all of the components, device elements, and hardware illustrated in and described with respect to the network apparatus 300 of FIG. 3 may be essential to this disclosure, and thus, some of these items may be omitted, consolidated, or otherwise modified within reason. Additionally, in some implementations, the subject matter associated with the network apparatus 300 can be configured to include additional or substitute components, device elements, or hardware, beyond those that are shown within FIG. 3.

Figure 4:
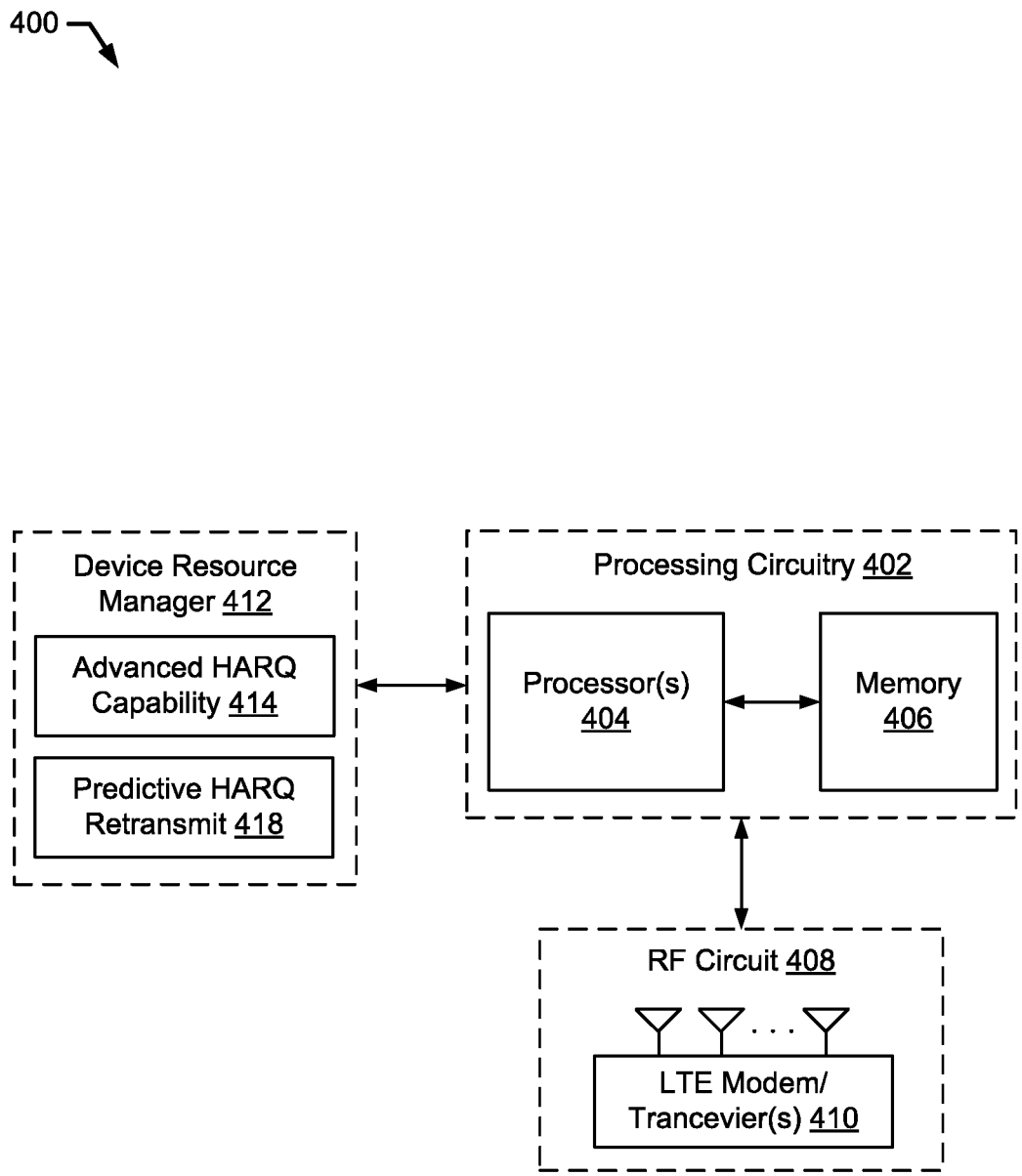
FIG. 4 shows a block diagram of a wireless communication device including a device resource manager having an advanced HARQ capability component and a predictive HARQ retransmission component, in accordance with some implementations of the disclosure.

FIG. 4 illustrates a block diagram of a communication device 400 (e.g., an LTE compliant UE) including an RF circuit 408 having one or more transceiver(s) and an LTE modem 410, as well as, a device resource manager 412 including an advanced HARQ capability component 414 and a predictive HARQ retransmit component 418, in accordance with some embodiments of the disclosure, which will be described further herein. In various configurations, the communication device 400 can include processing circuitry 402 that can perform various reduced HARQ operations in the DL, as well as, various reduced HARQ operations in the UL.

Further, the processing circuitry 402 of the communication device 400 can employ the advanced HARQ capability component 414 to perform advanced HARQ capability signaling to a network apparatus 300 (e.g., an eNodeB) in accordance with various embodiments. The advanced HARQ capability signaling procedures will become more apparent after reviewing the ensuing descriptions associated with the procedures of FIGS. 8 and 9. In some configurations, the processing circuitry 402 of the communication device 400 can employ the predictive HARQ retransmit component 418 to predict one or more HARQ NACK instances to provide early feedback to an eNodeB to activate various automatic HARQ retransmissions, in accordance with other embodiments. The predictive HARQ retransmit procedures will become more apparent after reviewing the ensuing description associated with the procedures of FIG. 15.

In this regard, the processing circuitry 402 can be configured to perform and/or control performance of one or more functionalities of the communication device 400 in accordance with various implementations, and thus, the processing circuitry 402 can provide functionality for performing one or more DL HARQ and/or UL HARQ processes (in conjunction with optional signaling form a network apparatus 300), in accordance with various scenarios that are described further herein. The processing circuitry 402 may further be configured to perform data processing, application execution and/or other control and management functions according to one or more embodiments of the disclosure.

The communication device 400 or portions or components thereof, such as the processing circuitry 402, can include one or more chipsets, which can respectively include any number of coupled microchips thereon. The processing circuitry 402 and/or one or more other components of the communication device 400 may also be configured to implement functions associated with various device power conservation procedures of the disclosure using multiple chipsets. In some scenarios, the communication device 400 may be associated with or employed as a multi-mode UE 106 of an LTE 102 or an LTE-A cell 104*a-b* to operate within the wireless communication system 100 of FIG. 1. In this implementation, the communication device 400 may include one or more chipsets configured to enable the apparatus to communicate within the LTE or LTE-A cells, 102 and 104*a-b*, of the wireless communication system 100.

In various scenarios, the processing circuitry 402 of the communication device 400 may include one or more processor(s) 404 and a memory component 406. The processing circuitry 402 may be in communication with, or otherwise coupled to, a radio frequency (RF) circuit 408 having an LTE compliant modem and one or more wireless communication transceivers 408. In some implementations, the RF circuit 408 including the modem and the one or more transceivers 410 may be configured to communicate using different LTE RAT types. For instance, in some embodiments the RF circuit 408 may be configured to communicate using an LTE RAT, and in other embodiments, the RF circuit 408 may be configured to communicate using an LTE-A RAT.

In some embodiments, the processor(s) 404 may be configured in a variety of different forms. For example, the processor(s) 404 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 404 of the communication device 400 can be coupled to and/or configured in operative communication with each other, and these components may be collectively configured to perform one or more procedures of the communication device 400 as described herein in the form of an LTE compliant UE 106.

In some implementations, the processors 404 can be configured to execute instructions that may be stored in the memory 406 or that can be otherwise accessible to the processors 404 in some other device memory. As such, whether configured as, or in conjunction with, hardware or a combination of hardware and software, the processors 404 of the processing circuitry 402 may be capable of performing operations according to various implementations described herein when configured accordingly.

In various embodiments, the memory 406 of the processing circuitry 402 may include multiple memory devices that can be associated with any common volatile or non-volatile memory type. In some scenarios, the memory 406 may be associated with a non-transitory computer-readable storage medium that can store various computer program instructions which may be executed by the processor(s) 404 during normal program executions. In this regard, the memory 406 can be configured to store information, data, applications, instructions, or the like, for enabling the communication device 400 to carry out various functions in accordance with one or more embodiments of the disclosure. In some implementations, the memory 406 may be in communication with, and coupled to, the processor(s) 404 of the processing circuitry 402, as well as one or more system buses for passing information between and amongst the different device components of the communication device 400.

It should be appreciated that not all of the components, device elements, and hardware illustrated in and described with respect to the communication device 400 of FIG. 4 may be essential to this disclosure, and thus, some of these items may be omitted, consolidated, or otherwise modified within reason. Additionally, in some implementations, the subject matter associated with the communication device 400 can be configured to include additional or substitute components, device elements, or hardware, beyond those depicted within FIG. 4.

Figure 5:
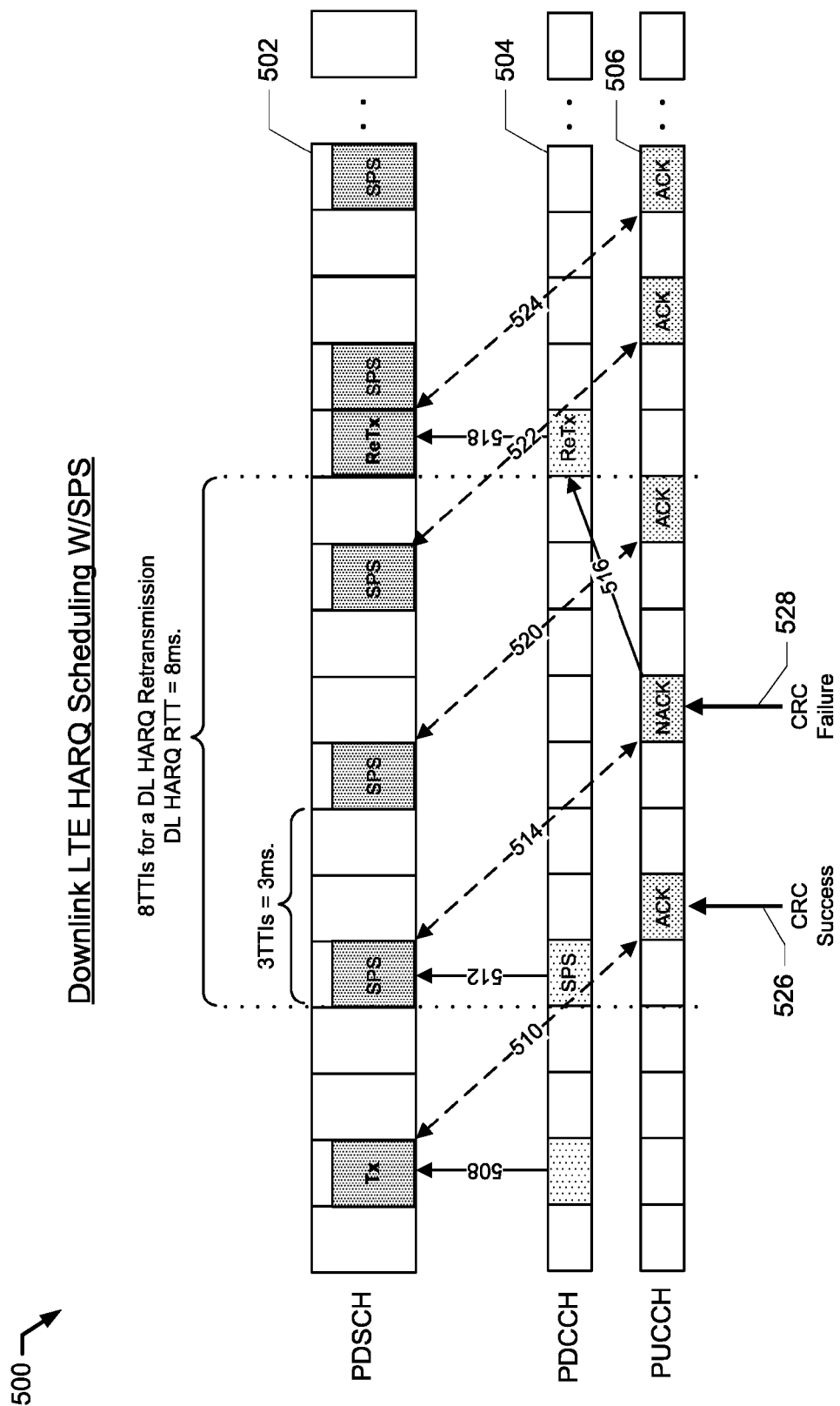
FIG. 5 shows a block diagram depicting DL HARQ scheduling with semi-persistent scheduling (SPS) procedures for LTE communications, in accordance with some embodiments.

FIG. 5 illustrates a block diagram depicting DL LTE HARQ scheduling 500 occurring in conjunction with SPS procedures for LTE communications, according to some embodiments of the disclosure. It should be understood that in various embodiments, the DL HARQ processes 500 shown in FIG. 5 may also occur in conjunction with various C-DRX power savings operations. In general, LTE HARQ processes can attempt to retransmit failed transport block (TB) communications in the DL and/or in the UL.

As would be understood by those skilled in the art, SPS routines may be employed by a network resource scheduler 312 of a network apparatus 300 (e.g., an eNodeB having RRC functionality) to reduce control channel signaling requirements for a UE 400 communicating periodic application data that has a relatively low duty cycle, such as VoLTE-type application data. In this manner, control signaling overhead relating to DL and/or UL resource assignments for a single UE or a group of UEs 400, which would typically be communicated via the PDCCH, may be significantly reduced or eliminated for a period of time when SPS is active.

By way of example, in VoLTE communications a VoLTE DL subframe can be scheduled for a UE every 20 ms, and as such, a significant amount of system bandwidth would be required to issue control signaling information for every VoLTE DL frame (occurring every 10 ms.) on a frame-by-frame basis. In this regard, SPS can allow a single SPS resource allocation for a UE 400 to persist for a specified duration or until modified or otherwise changed by a controlling network service provider entity 300. In some implementations, a resource allocation change that could overwrite an existing SPS allocation may be issued by a network apparatus 300 employing a network resource scheduler 312 (e.g., an eNodeB having RRC functionality), to instruct a UE 400 to again monitor a control channel (e.g., the PDCCH) for new resource allocations or grants. As noted above, SPS is configurable for both DL communications and UL communications; however, SPS is often more effectively employed in the DL, where control information overhead problems can be more pronounced.

The DL HARQ scheduling procedures 500 of FIG. 5 depict signaling interactions between the PDSCH 502, the PDCCH 504, and the PUCCH 506, during various DL HARQ processes. As would be understood by those skilled in the art, the PDCCH 504 may include downlink control information (DCI), e.g., emanating from an eNodeB, that informs a UE 400 of various DL resource allocations for the PDSCH 502, HARQ information relating to the PDSCH 502, various UL scheduling grants for the PUSCH, etc. The PUCCH 506 can carry DL HARQ acknowledgements (e.g., ACK/NACKs) that are transmitted by a UE 400 to a network apparatus 300 in response to the UE 400 receiving, or not receiving, various DL data transmissions via the PDSCH 502.

In some situations, a DL allocation 508 may be transmitted from a network apparatus 300 employing a network resource scheduler 312 having DL HARQ capability 318 (e.g., an eNodeB having RRC functionality) within the PDCCH 504 to a UE 400 to identify a particular set of designated DL resource blocks (RBs) where the UE 400 should attempt to decode the PDSCH 502 for DL information. Upon acquiring, or attempting to acquire, the identified DL information from the PDSCH 502 corresponding to the DL allocation 508, an intended recipient UE 400 can send a positive DL HARQ acknowledgement (ACK) message 510 or a negative DL HARQ acknowledgement (NACK) message 514 to the network apparatus 300 via the PUCCH 506.

The DL HARQ ACK/NACK acknowledgements can indicate to the network apparatus 300 (e.g., an eNodeB having RRC functionality) whether or not the DL information was received or acquired by the UE 400 and/or whether DL information that was acquired by the UE 400 is free from errors, e.g., according to a cyclic redundancy check (CRC) result. In some scenarios, a DL CRC success result 526 can indicate that DL information was acquired by a UE 400 without. Alternatively, a DL CRC failure result 528 may indicate that scheduled DL information was not acquired by a UE 400. As would be understood by those skilled in the art, a UE 400 will typically issue a DL HARQ ACK message to a network apparatus 300 (e.g., an eNodeB) via the PUCCH 506 in response to receiving a DL CRC success result 526. Likewise, a UE 400 will typically issue a DL HARQ NACK message to a network apparatus 300 (e.g., an eNodeB) in response to receiving a DL CRC failure result 528.

In accordance with the DL HARQ SPS example 500, an ongoing SPS DL resource allocation 512 may be sent by a network apparatus 300 employing the DL HARQ scheduler 318 (e.g., an eNodeB having RRC functionality) to a UE 400 to instruct the UE 400 to attempt to decode the PDSCH 502 for known, recurring DL information on a periodic basis (e.g., every 10 TTIs), such that the UE 400 is not required to further decode the PDCCH 504 until a change to the ongoing SPS allocation 512 is detected. Accordingly, at every designated SPS interval (e.g., every 10 ms.) a UE 400 can attempt to decode the PDSCH 502 for prescheduled DL information. Depending on whether or not the DL information has been successfully acquired by the UE 400 via the PDSCH 502 and/or whether or not the DL information was acquired without errors, the UE 400 can send a DL HARQ ACK message 510, 520, 522, and 524, or a DL HARQ NACK message 514 to the network apparatus 300 (e.g., an eNodeB) via the PUCCH 506.

In various implementations, upon receiving a DL HARQ NACK 514 message via the PUCCH 506 that indicates a DL transmission failure or error (e.g., corresponding to a CRC failure result 528), a network apparatus 300 employing the DL HARQ scheduler 318 (e.g., an eNodeB having RRC functionality) can attempt to retransmit the DL information and/or a portion of the DL information 516 to the UE 400 at a later time, in accordance with a designated retransmission interval/duration (e.g., 4TTIs later=4 ms.). In various scenarios, a total retransmission time or round trip time (RTT) for the UE 400 to receive the correct and/or complete DL information may be scheduled to occur within a particular number of TTIs to account for anticipated network communication and device processing delays (e.g., a DL RTT of 8TTIs=8 ms.).

In some scenarios, a network apparatus 300 employing the DL HARQ scheduler 318 can evaluate a DL HARQ NACK 514 received via the PUCCH 506 to determine when to schedule a DL retransmission 516 based on various network considerations, including an application data type being communicated in the DL. The UE 400 can thereafter be informed of the DL retransmission schedule 516 by receiving a supplemental DL allocation 518 for the retransmission within the PDCCH 504, as designated by the network apparatus 300 (e.g., an eNodeB having RRC functionality). As would be understood by those skilled in the art, this DL HARQ retransmission can occur on top of ongoing SPS operations, such that the DL HARQ procedures 500 requiring the UE 400 to decode the PDCCH 504 for retransmit control information will supersede SPS PDCCH "do not decode" durations (described above).

Notably, the designated DL RTT (e.g., a RTT≥8 ms.) for DL HARQ operations 500 requires a UE 400 to expend local device resources (e.g., battery power, processing power, available memory, etc.) for an extended duration in order to reattempt acquiring the DL information from the PDSCH 502. It should be understood that DL HARQ processes are asynchronous, and as such, the DL RTT may vary. In contrast, UL HARQ processes are synchronous and the UL RTT is generally set at 8 ms. When these DL HARQ procedures 500 occur during existing SPS power saving operations or during existing C-DRX power saving operations, the DL HARQ processes will interrupt a UE's 400 power conservation mode (e.g., a device sleep mode) by requiring the UE 400 to: identify a DL CRC failure event 528, respond to the network apparatus 300 (e.g., an eNodeB) with a DL HARQ NACK message 516 over the PUCCH 506, and then listen for DL retransmit (ReTx) control information 518 over the PDCCH 504, to be able to decode the PDSCH 502 for DL retransmissions. During these DL HARQ processes, a UE 400 will typically need to remain awake for the entire duration of the designated DL HARQ RRT. Accordingly, the shorter the DL HARQ RRT, the longer a UE 400 will be able to remain asleep/inactive when it is engaged in an SPS power saving mode and/or a C-DRX power saving mode.

Figure 6:
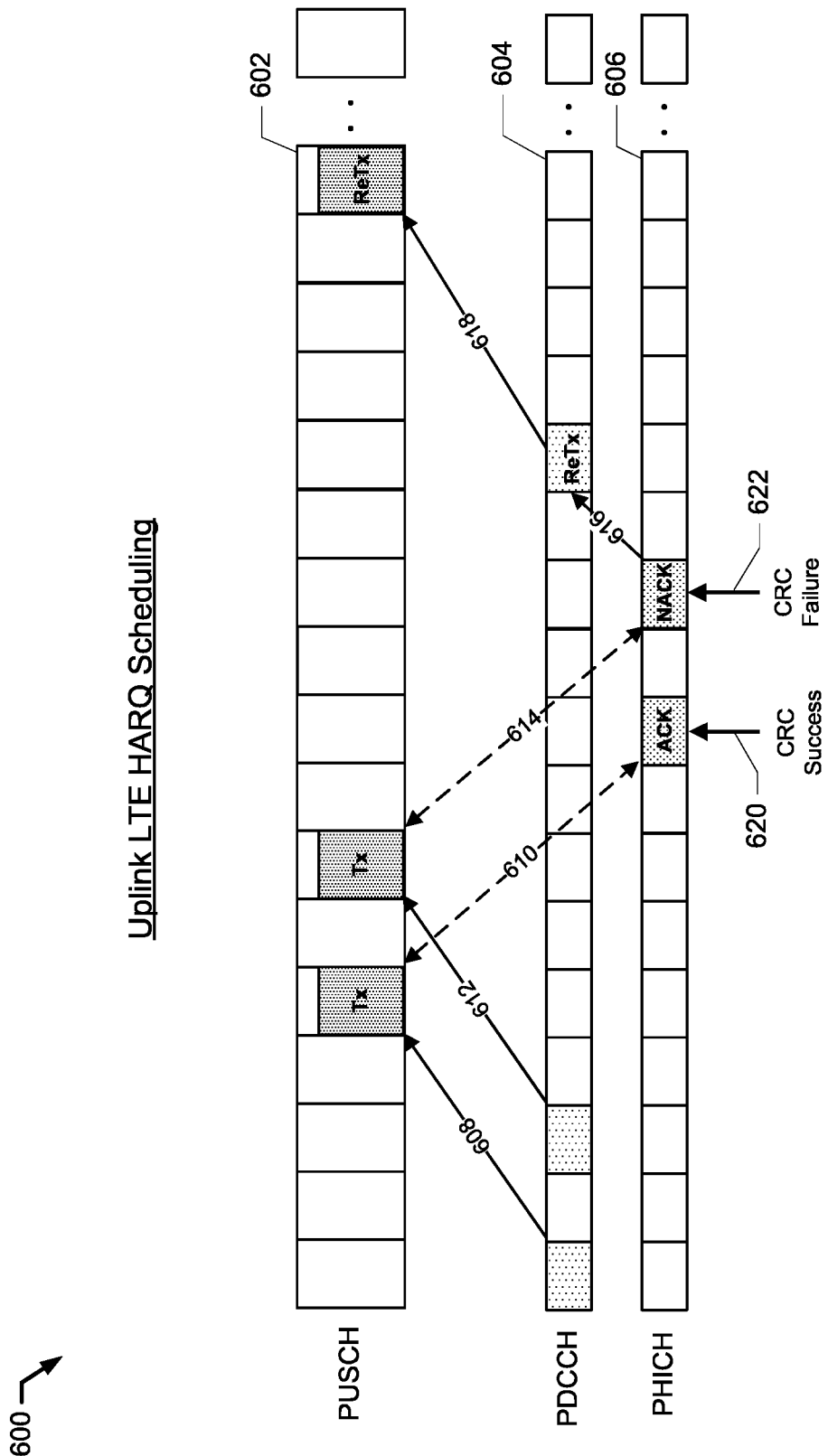
FIG. 6 shows a block diagram depicting UL HARQ scheduling procedures, in accordance with various embodiments of the disclosure.

FIG. 6 illustrates a block diagram depicting UL LTE HARQ scheduling procedures 600 in accordance with various embodiments of the disclosure. Although not depicted in FIG. 6, it should be understood that in some implementations UL HARQ processes 600 can occur in conjunction with SPS and/or C-DRX power saving routines. As described above, HARQ processes are configured to occur on top of SPS and C-DRX procedures, thereby preempting designated UE 400 power savings modes associated with SPS and/or C-DRX by requiring a UE 400 to remain awake long enough to perform requisite HARQ processing functions.

The UL HARQ scheduling procedures 600 of FIG. 6 depict signaling interactions between the PUSCH 602, the PDCCH 604, and the PHICH 606, during various UL HARQ processes. As would be understood by those skilled in the art, the PHICH 606 is configured to carry UL HARQ acknowledgements (e.g., ACK/NACKs) that can be transmitted by a network apparatus 300 (e.g., an eNodeB) in response to receiving, or not receiving, various expected UL data transmissions from a UE or a group of UEs 400 that it provides LTE communications service to.

In some embodiments, an UL grant 608 may be transmitted from a network apparatus 300 employing a network resource scheduler 312 having UL HARQ capability 318 (e.g., an eNodeB having RRC functionality) within the PDCCH 604 to a UE 400 to identify a particular set of designated UL RBs where the UE 400 should attempt to transmit UL information to the network apparatus 300 in accordance with a predefined TTI interval (e.g., every 4 TTIs=4 ms.). In this configuration, there will be a TTI delay between a time when the UE 400 receives the UL grant 608 via the PDCCH 604 and a time when the UL RBs allocated to UE 400 for the UL transmission become available. The TTI delay is intended to give the UE 400 sufficient time to process the UL data and determine how best to transmit a corresponding UL transport block (TB), e.g., in accordance with various network-designated quality of service (QoS) requirements.

Upon receiving, or attempting to receive, an UL transmission via the PUSCH 602 corresponding to an UL grant, 608 or 612, a recipient network apparatus 300 (e.g., an eNodeB) can transmit either a positive UL HARQ acknowledgement (ACK) message 610 or a negative UL HARQ acknowledgement (NACK) message 614 to the sending UE 400 via the PHICH 606, e.g., on the DL from the network apparatus 300. The UL HARQ ACK/NACK acknowledgements, 610 and 614, can indicate to the UE 400 whether or not an UL TB was received or acquired by the network apparatus 300 and/or whether information of the UL TB that was acquired by the network apparatus 300 is free from errors, e.g., according to a corresponding cyclic redundancy check (CRC) result, 620 or 622. In various embodiments, an UL CRC success result 620 can indicate that the UL TB was received by the network apparatus 300 without error. Alternatively, an UL CRC failure result 622 may indicate that the UL TB was erroneously received by the network apparatus 300.

As would be understood by those skilled in the art, a network apparatus 300 (e.g., an eNodeB having RRC functionality) will typically issue an UL HARQ ACK message to a corresponding UE 400 via the PHICH 606 in response to an UL CRC success result 620. Similarly, a network apparatus 300 (e.g., an eNodeB having RRC functionality) will typically issue an UL HARQ NACK message to a UE 400 via the PHICH 606 in response to an UL CRC failure result 622.

In some implementations, upon receiving an UL HARQ NACK 614 via the PHICH 606 from a network apparatus 300 that indicates an UL transmission failure or error (e.g., corresponding to an UL CRC failure result 622), a UE 400 can attempt to retransmit the UL TB and/or a portion of the UL TB information 616 to the network apparatus 300 at a later time, in accordance with a designated retransmission interval (e.g., within 4TTIs=4 ms.). In various scenarios, a total retransmission time or round trip time (RTT) for the network apparatus 300 to receive the correct and/or complete UL TB from the UE 400 may be scheduled to occur within a designated number of TTIs associated with an UL HARQ RTT to account for anticipated network communication and device processing delays (e.g., an UL RTT of 8TTIs=8 ms.).

In various instances, a network apparatus 300 employing the UL HARQ scheduler 318 can evaluate a failed UL transmission (e.g., an UL CRC failure 622 corresponding the UL NACK message 614) to schedule an UL retransmission 616 based on various network considerations, including an application data type being communicated in the UL (e.g., a VoLTE application data type). The UE 400 can thereafter receive a supplemental UL grant 618 for the UL retransmission within the PDCCH 604. As the UL HARQ is synchronous, the supplemental PDCCH grant 618 can differentiate between adaptive and non-adaptive UL HARQ retransmissions.

Similar to the DL HARQ procedures 500 described above with respect to FIG. 5, the UL HARQ procedures 600 can occur during existing SPS power saving operations or during existing C-DRX power saving operations. In these scenarios, during an UL HARQ procedure 600, when the UE 400 receives a PHICH NACK message from the eNodeB 300 (e.g., 4 ms. after the original UL transmission), the UE 400 needs to stay awake longer than is necessary, i.e., during VoLTE communications. This can effectuate an interruption of the UE's 400 power conservation mode (e.g., a device sleep mode). Further, during UL HARQ processes 600, a UE 400 will typically need to remain awake for the entire duration of a designated UL HARQ RRT. Accordingly, the shorter the designated HARQ UL RRT, the longer a UE 400 will be able to remain asleep/inactive when it is engaged in an SPS power saving mode and/or a C-DRX power saving mode.

Figure 7:
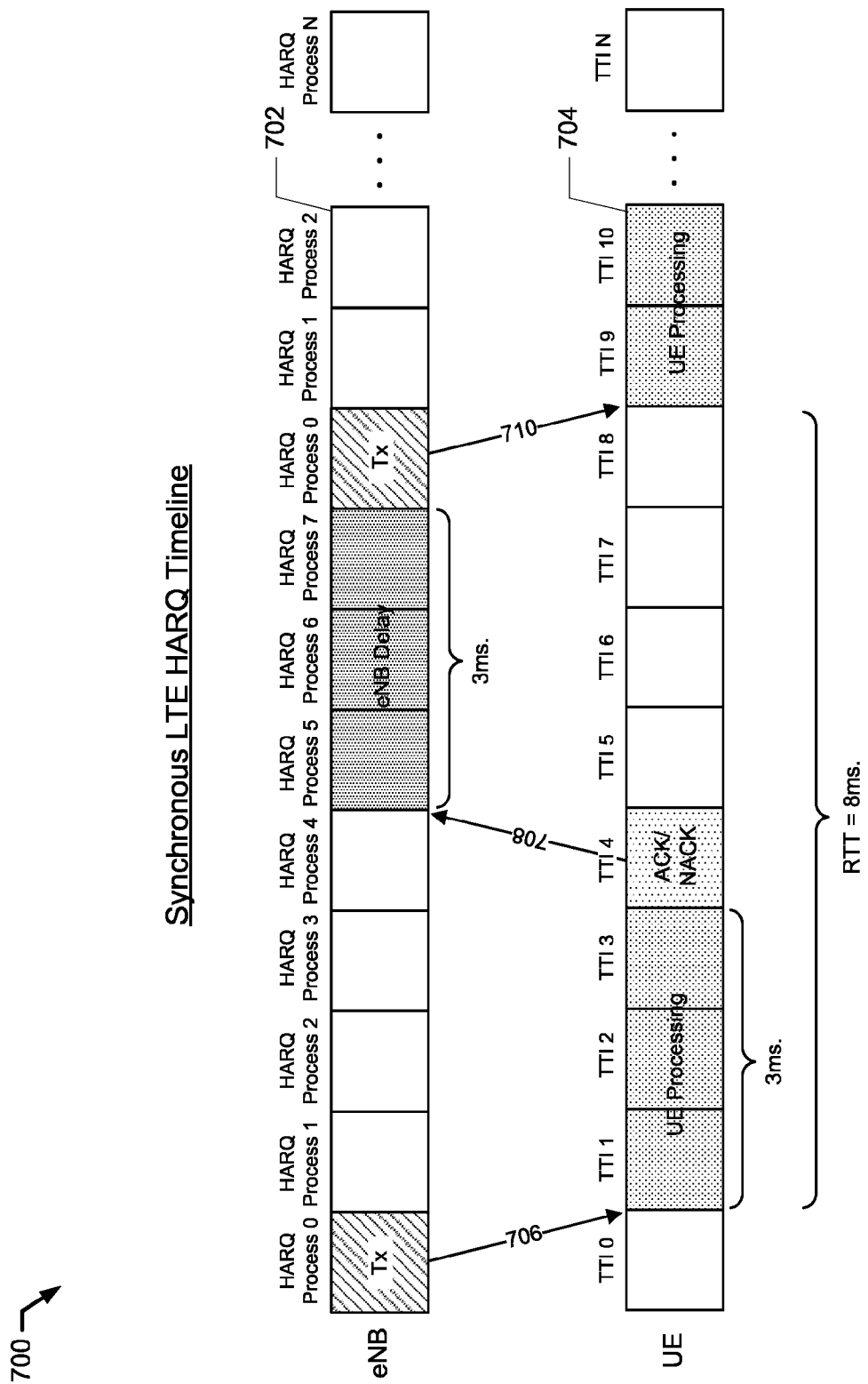
FIG. 7 shows a block diagram depicting a synchronous LTE HARQ processing timeline, in accordance with various implementations of the disclosure.

FIG. 7 illustrates a simplified block diagram depicting an example synchronous LTE HARQ timeline 700 in accordance with various implementations of the disclosure. The synchronous HARQ timeline 700 represents DL HARQ communications between an eNodeB 702 and a UE 704 in accordance with some embodiments. It should be understood, however, that DL HARQ communications are generally asynchronous. Further, an equivalent synchronous LTE HARQ timeline representing UL HARQ communications between a UE 400 and a network apparatus 300 could be similarly represented without departing from the spirit and scope of the disclosure, e.g., in the manner described above with respect to FIG. 6. Further, although the simplified block diagram of FIG. 7 shows a synchronous HARQ timeline 700 without reference to any SPS or C-DRX procedures, it should be understood that SPS and/or C-DRX UE power conservation processes could be included within the context of the synchronous HARQ timeline 700, e.g., in the manner described above for FIG. 5.

During an initial HARQ process (HARQ Process 0), the eNodeB 702 can be configured to transmit DL information 706 to a UE 704 during a first TTI (TTI 0). After receiving the DL information from the eNodeB 702, the UE 704 can process the received DL transmission over the duration of next three TTIs (from TTI 1 through TTI 3), which is associated with a 3 ms. UE processing delay. This DL data processing schedule requires the UE 704 to wait until the fifth TTI (TTI 4) to send a HARQ acknowledgement (ACK/NACK) message 708 to the eNodeB 702. Upon receipt of the HARQ ACK/NACK message 708 from the UE 704, the eNodeB 702 can process the received DL transmission over the duration of the next three TTIs (from TTI 5 through TTI 7), in accordance with a network-designated eNodeB 702 processing delay interval, which is associated with a 3 ms. eNodeB 702 processing delay.

Subsequently, at a time associated with the ninth TTI (TTI 8) the eNodeB 702 can attempt to retransmit a failed DL transmission associated with a NACK message 708 having been received from the UE 704 at the fifth TTI (TTI 4). Notably, in this configuration, the DL HARQ RTT occurs over the course of 8 TTIs which takes 8 ms., without consideration of a data type being transmitted in the DL. As explained above, for low duty cycle VoLTE data, this RRT may be excessive, as the UE 704 processing delay (e.g., a UE delay of 3TTIs=3 ms.) and the eNodeB 702 processing delay (e.g., an eNodeB delay of 3TTIs=3 ms.) for VoLTE-type data can be significantly reduced while still adequately accommodating for processing low-bandwidth, periodic application data.

Figure 8:
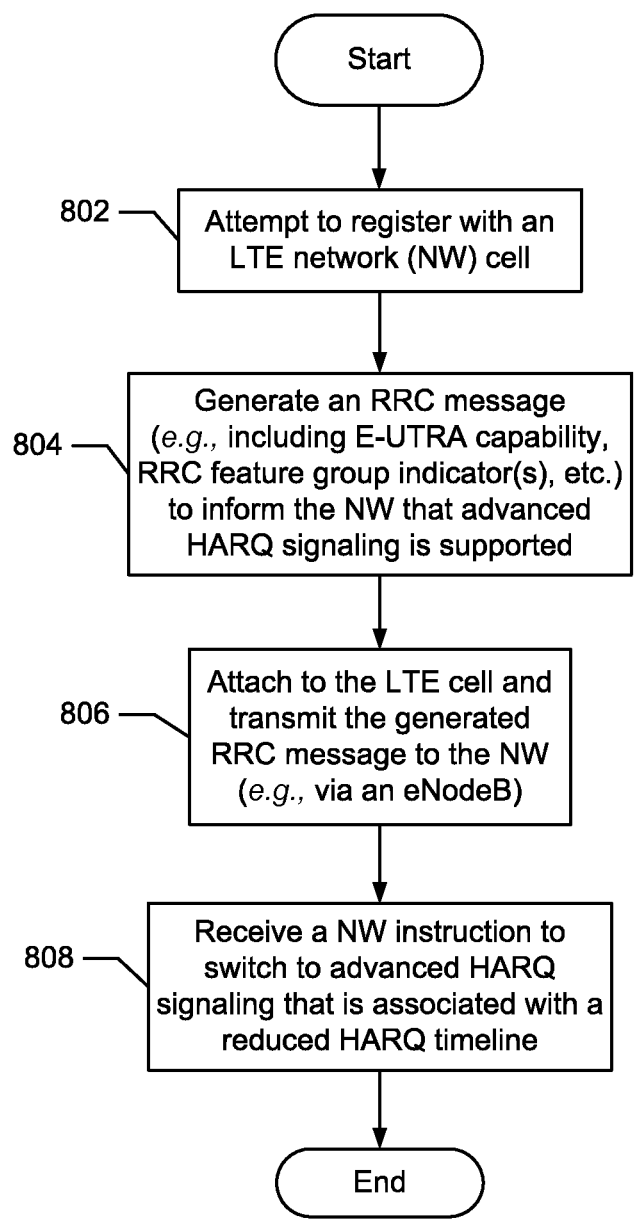
FIG. 8 shows a flowchart associated with example methods where a UE informs its network service provider entity of its advanced HARQ capability via RRC messaging, in accordance with various embodiments.

FIG. 8 illustrates a flowchart associated with various procedures 800 where a UE 400 informs its network apparatus 300 (e.g., an eNodeB) of its advanced HARQ capability via RRC messaging in accordance with various embodiments. In this regard, it should be understood that any or all of the procedures 800 depicted in FIG. 8 may be associated with a method, or methods, that can be implemented by the execution of computer program instructions stored on a non-transitory computer-readable memory 406 of a UE 400, and optionally, in conjunction with the execution of computer program instructions stored on a non-transitory computer-readable memory 306 of a an eNodeB 300.

Initially, at operation block 802, a UE 400 may attempt to register with an LTE network cell 102 or with an LTE-A network cell 104*a*-*b* by communicating with a corresponding cell's eNodeB 300 using its LTE Modem/Transceiver components 410 of its RF circuit 408. After registering with the network eNodeB 300, at operation block 804, the UE 400 can generate an RRC message to inform the eNodeB 300 whether it has advanced HARQ signaling capability, which will allow the UE 400 to collaborate with the eNodeB 300 to perform one or more reduced DL HARQ processes or one or more reduced UL HARQ processes, in accordance with various embodiments. For instance, the UE 400 can employ its device resource manager's 412 advanced HARQ capability component 414 to generate the RRC message.

In some implementations, the UE-generated RRC message can include, but is not limited to including, enhanced universal terrestrial radio access (EUTRA) capability information, feature group indicator (FGI) information, etc., to allow an eNodeB 300 receiving the RRC message from the UE 400 to discern whether or not the UE 400 is able to support its reduced HARQ timeline functionality. Next, at operation block 806, the UE 400 can attach to the eNodeB 300 and then transmit the generated RRC message to the network eNodeB 300. After receiving the RRC message the eNodeB 300 can determine whether or not to activate a reduced DL HARQ timeline or a reduced UL HARQ timeline in the future based on the nature of the applications the UE is running, the data rates associated with those applications, etc., e.g., in accordance with the procedures 900 described further herein with respect to FIG. 9.

After the UE 400 transmits the RRC message to the eNodeB 300, it may be configured to await further instruction from the eNodeB 300 as to when and how to implement subsequent HARQ processes. In some scenarios, at operation block 808, the UE 400 may receive a network instruction from an eNodeB to switch to an advanced HARQ signaling procedure that can be associated with a reduced DL HARQ timeline or a reduced UL HARQ timeline.

Figure 9:
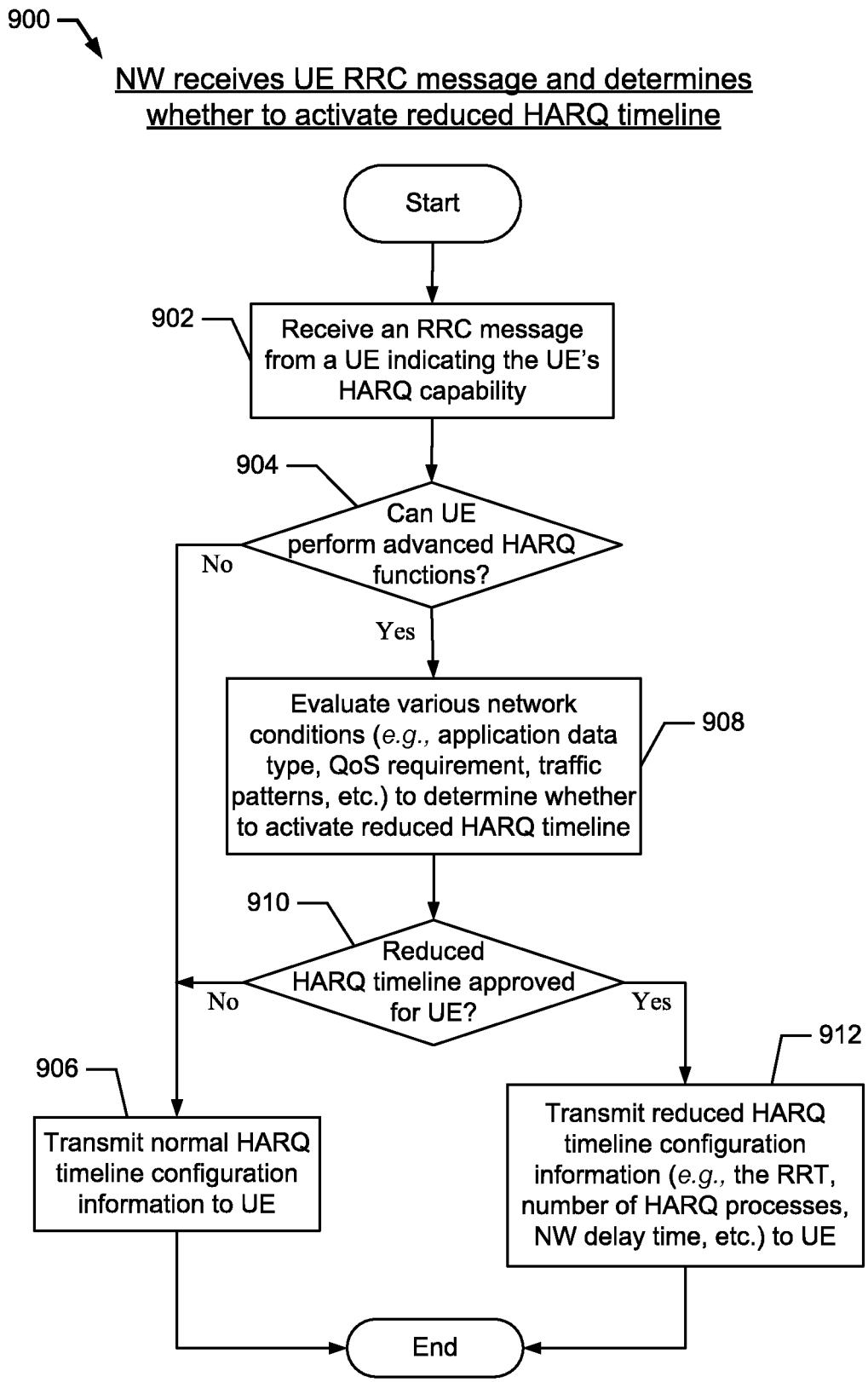
FIG. 9 shows a flowchart associated with example methods where a network service provider entity determines whether to activate a reduced HARQ timeline schedule for a UE based its HARQ capability and various network considerations, in accordance with some embodiments.

FIG. 9 illustrates a flowchart associated with various procedures 900 where a network apparatus 300 (e.g., an eNodeB) determines whether to activate a reduced HARQ timeline schedule for a UE based its HARQ capability and various other network considerations, in accordance with some embodiments. In this regard, it should be understood that any or all of the procedures 900 depicted in FIG. 9 may be associated with a method, or methods, that can be implemented by the execution of computer program instructions stored on a non-transitory computer-readable memory 306 of an eNodeB 300, and optionally, in conjunction with the execution of computer program instructions stored on a non-transitory computer-readable memory 406 of a UE 400.

Initially, at operation block 902, a network apparatus 300 (e.g., an eNodeB having RRC functionality) may receive an RRC message from a UE 400 (e.g., in the manner described above with respect to FIG. 8) that indicates whether the UE 400 supports advanced HARQ functions allowing the UE 400 to collaborate with the eNodeB 300 to perform various reduced DL HARQ timeline processes or various reduced UL HARQ timeline processes. Next, at decision block 904, the eNodeB 300 can evaluate the content of the RRC message (e.g., content associated with EUTRA capability information, FGI information, etc.,) received from the UE 400 to determine if the UE 400 can perform one or more advanced HARQ functions.

In a scenario where the eNodeB 300 determines that the UE 400 does not support one or more advanced HARQ functions, at operation block 906, the eNodeB 300 can transmit normal HARQ timeline configuration information, e.g., which is not associated with a reduced HARQ timeline, to the UE 400. However, in a scenario where the eNodeB 300 determines that the UE 400 does support one or more advanced HARQ functions, at operation block 908, the eNodeB 300 can further evaluate various network conditions (e.g., application data type, network QoS requirements, historical traffic patterns, etc.) to determine whether or not to activate a reduced DL HARQ timeline or a reduced UL HARQ timeline for the UE 400.

Next, at decision block 910, the eNodeB 300 can make a determination, based on the content of the received RRC message and its network condition evaluations, as to whether a corresponding reduced HARQ timeline is approved for the UE 400. In a scenario where the eNodeB 300 determines that a corresponding reduced HARQ timeline is not approved for the UE 400, at operation block 906, the eNodeB 300 can transmit normal HARQ timeline configuration information, e.g., which is not associated with a reduced HARQ timeline, to the UE 400.

However, in a scenario where the eNodeB 300 determines that a corresponding reduced HARQ timeline is approved for the UE 400, at operation block 912, the eNodeB 300 can transmit reduced HARQ timeline configuration information (e.g., the RRT for the reduced HARQ timeline, the HARQ procedure requirements for the reduced HARQ timeline, a corresponding network eNodeB 300 delay associated with the reduced HARQ timeline, etc.), to the UE 400. It should be understood that the eNodeB 300 can effectively shorten a HARQ RRT by reducing a number of HARQ processes to be supported.

In accordance with various embodiments, if the eNodeB 300 determines that the UE 400 is communicating VoLTE-type application data, the eNodeB 300 may be configured to send the reduced HARQ timeline configuration information alongside C-DRX and SPS configuration information to the UE 400, e.g., within an RRC message. Further, in some scenarios, the reduced HARQ timeline configuration information may be defined by RRC information elements within an RRC message, which can be transmitted from the eNodeB 300 to the UE 400, at operation block 912.

Figure 10:
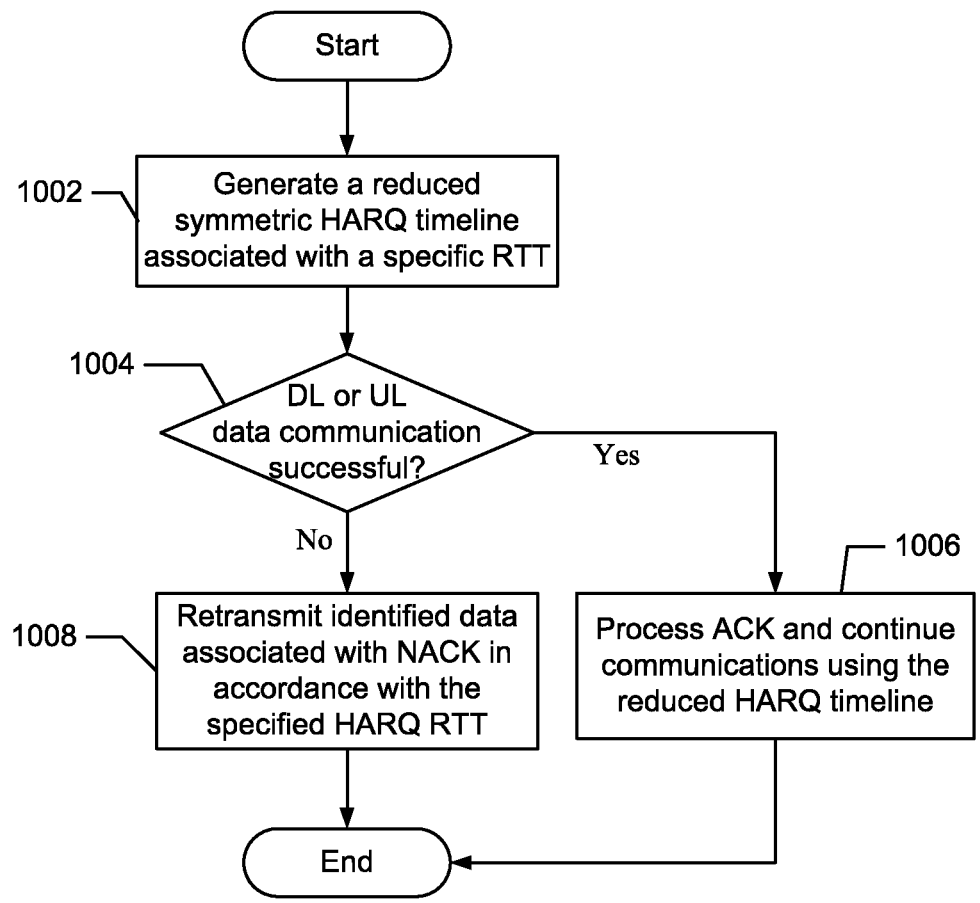
FIG. 10 shows a flowchart associated with example methods for establishing a reduced symmetric HARQ timeline, in accordance with some implementations of the disclosure.

FIG. 10 illustrates a flowchart associated with various procedures 1000 for establishing a reduced symmetric HARQ timeline, in accordance with some implementations of the disclosure. In this regard, it should be understood that any or all of the procedures 1000 depicted in FIG. 10 may be associated with a method, or methods, that can be implemented by the execution of computer program instructions stored on a non-transitory computer-readable memory 306 of an eNodeB 300, and optionally, in conjunction with the execution of computer program instructions stored on a non-transitory computer-readable memory 406 of a UE 400.

Initially, at operation block 1002, an eNodeB 300 having RRC functionality may be configured to generate a reduced symmetric HARQ timeline in the DL or in the UL, where the reduced symmetric HARQ timeline is associated with a designated RTT duration (e.g., a reduced RRT=4 ms. or 6 ms.) that less than a default network HARQ timeline duration (e.g., a default RRT=8 ms.). In various embodiments, this reduced HARQ timeline may be generated for VoLTE communications due to the low duty cycle associated with VoLTE data type transmissions. Next, at decision block 1004, the eNodeB 300 can attempt to determine if the particular DL or UL transmission was successful (e.g., in response to receiving a HARQ acknowledgement ACK/NACK message).

In a scenario where the eNodeB 300 determines that a particular HARQ transmission was successful, at operation block 1006, the eNodeB 300 can continue communicating data with a corresponding UE 400 in accordance with the reduced symmetric HARQ timeline. However, in a scenario where the eNodeB 300 determines that the HARQ transmission was not successful (e.g., as represented by a HARQ NACK message), the eNodeB 300 can identify data to be retransmitted in the accordance with the reduced symmetric HARQ timeline. Thereafter, at operation block 1008, the eNodeB 300 can retransmit the identified data associated with a NACK message to the UE 400 in accordance with the designated HARQ RTT, after which, the eNodeB 300 may continue communicating data with the UE 400 using the reduced HARQ timeline.

Figure 11:
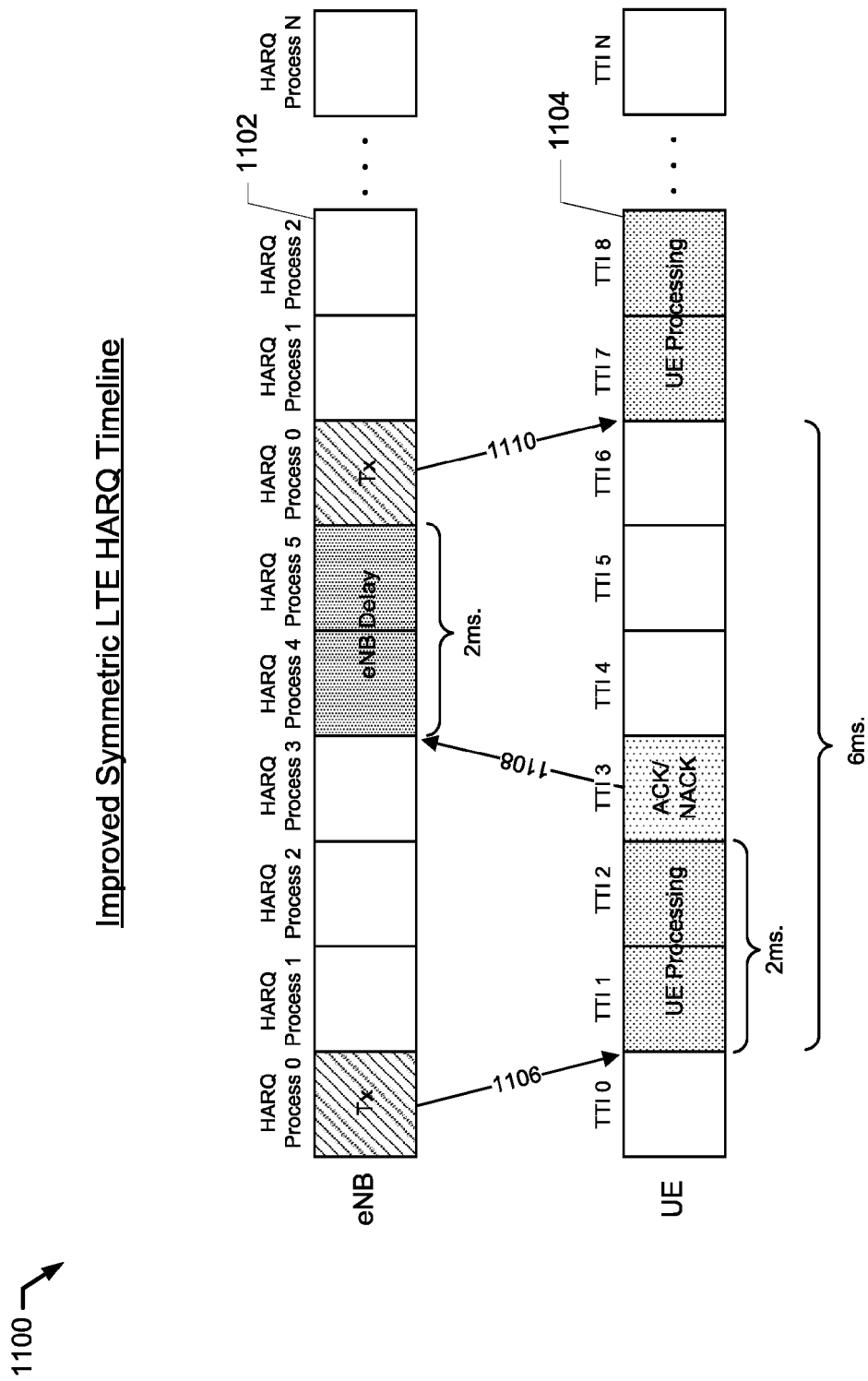
FIG. 11 shows a block diagram depicting an improved symmetric LTE HARQ processing timeline, in accordance with some embodiments of the disclosure.

FIG. 11 illustrates a simplified block diagram depicting an improved (reduced) symmetric LTE HARQ processing timeline 1100, in accordance with various implementations of the disclosure. The reduced symmetric HARQ timeline 1100 represents DL HARQ communications between an eNodeB 1102 and a UE 1104 in accordance with some embodiments. It should be understood, however, that an equivalent reduced symmetric LTE HARQ timeline representing UL HARQ communications between a UE 400 and a network apparatus 300 could be similarly represented without departing from the spirit and scope of the disclosure, e.g., in the manner described above with respect to FIG. 6. Further, although the simplified block diagram of FIG. 11 shows a symmetric HARQ timeline 1100 without reference to any SPS or C-DRX procedures, it should be understood that these UE power conservation processes could be included within the context of the symmetric HARQ timeline 1100, e.g., in the manner described above for FIG. 5.

During an initial HARQ process (HARQ Process 0), the eNodeB 1102 can be configured to transmit DL information 1106 to a UE 1104 during a first TTI (TTI 0). After receiving the DL information from the eNodeB 1102, the UE 1104 can process the received DL transmission over the duration of next two TTIs (from TTI 1 through TTI 2), which is associated with a reduced 2 ms. UE processing delay (with reference to the UE processing delay period of FIG. 7). This DL data processing schedule only requires the UE 1104 to wait until the fourth TTI (TTI 3) to send a HARQ acknowledgement (ACK/NACK) message 1108 to the eNodeB 1102. Upon receipt of the HARQ ACK/NACK message 1108 from the UE 1104, the eNodeB 1102 can process the received DL transmission over the duration of only the next two TTIs (from TTI 4 through TTI 5), in accordance with a network-designated eNodeB 1102 processing delay interval, which is associated with a reduced 2 ms. eNodeB 1102 processing delay (with reference to the eNodeB 1102 processing delay period of FIG. 7).

Subsequently, at a time associated with the seventh TTI (TTI 6) the eNodeB 1102 can attempt to retransmit a failed DL transmission associated with a NACK message 1108 having been received from the UE 1104 at the fourth TTI (TTI 3). Notably, in this configuration, the DL HARQ RTT occurs over the course of only 6 TTIs which takes 6 ms. This RTT designation can be made with consideration of a data type being transmitted to a UE 1104 in the DL. For low duty cycle VoLTE data, the reduced RRT may be reduced even more, e.g., where the RTT is equivalent to 4 TTIs, which takes only 4 ms. In this configuration, a corresponding UE 1104 processing delay could be reduced to 1 TTI and a corresponding eNodeB 1102 processing delay could also be reduced to 1 TTI for VoLTE-type data communications occurring in either the DL or in the UL.

Figure 12:
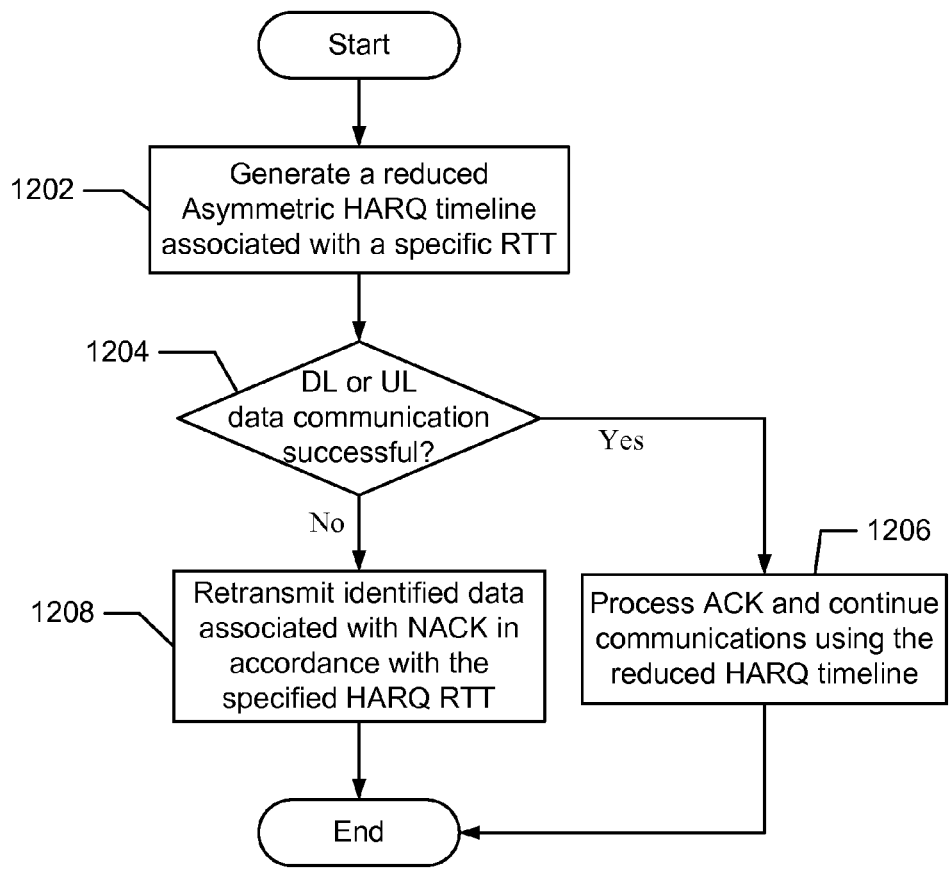
FIG. 12 shows a flowchart associated with example methods for establishing a reduced asymmetric HARQ timeline, in accordance with some implementations of the disclosure.

FIG. 12 illustrates a flowchart associated with various procedures 1200 for establishing a reduced asymmetric HARQ timeline, in accordance with some implementations of the disclosure. In this regard, it should be understood that any or all of the procedures 1200 depicted in FIG. 12 may be associated with a method, or methods, that can be implemented by the execution of computer program instructions stored on a non-transitory computer-readable memory 306 of an eNodeB 300, and optionally, in conjunction with the execution of computer program instructions stored on a non-transitory computer-readable memory 406 of a UE 400.

Initially, at operation block 1202, an eNodeB 300 having RRC functionality may be configured to generate a reduced asymmetric HARQ timeline in the DL or UL, where the reduced asymmetric HARQ timeline is associated with a designated RTT duration (e.g., a reduced RRT=4 ms. or 6 ms.) that less than a default network HARQ timeline duration (e.g., a default RRT=8 ms.). In various embodiments, this reduced HARQ timeline may be generated for VoLTE communications due to the low duty cycle associated with VoLTE data type transmissions. Next, at decision block 1204, the eNodeB 300 can attempt to determine if the particular DL or UL transmission was successful (e.g., in response to receiving a HARQ acknowledgement ACK/NACK message).

In a scenario where the eNodeB 300 determines that a particular DL transmission was successful (e.g., in response to receiving a HARQ ACK message), at operation block 1206, the eNodeB 300 can process the ACK message and then continue communicating data with a corresponding UE 400 using the reduced HARQ timeline. However, in a scenario where the eNodeB 300 determines that a particular DL transmission was not successful (e.g., in response to receiving a HARQ NACK message), at operation block 1208, the eNodeB 300 can evaluate the NACK message and identify data to be retransmitted in the accordance with the reduced asymmetric HARQ timeline. Subsequently, the eNodeB 300 can retransmit the identified data associated with the NACK message to the UE 400 in accordance with the designated HARQ RTT, after which, the eNodeB 300 may continue communicating data with the UE 400 using the reduced HARQ timeline.

Figure 13:
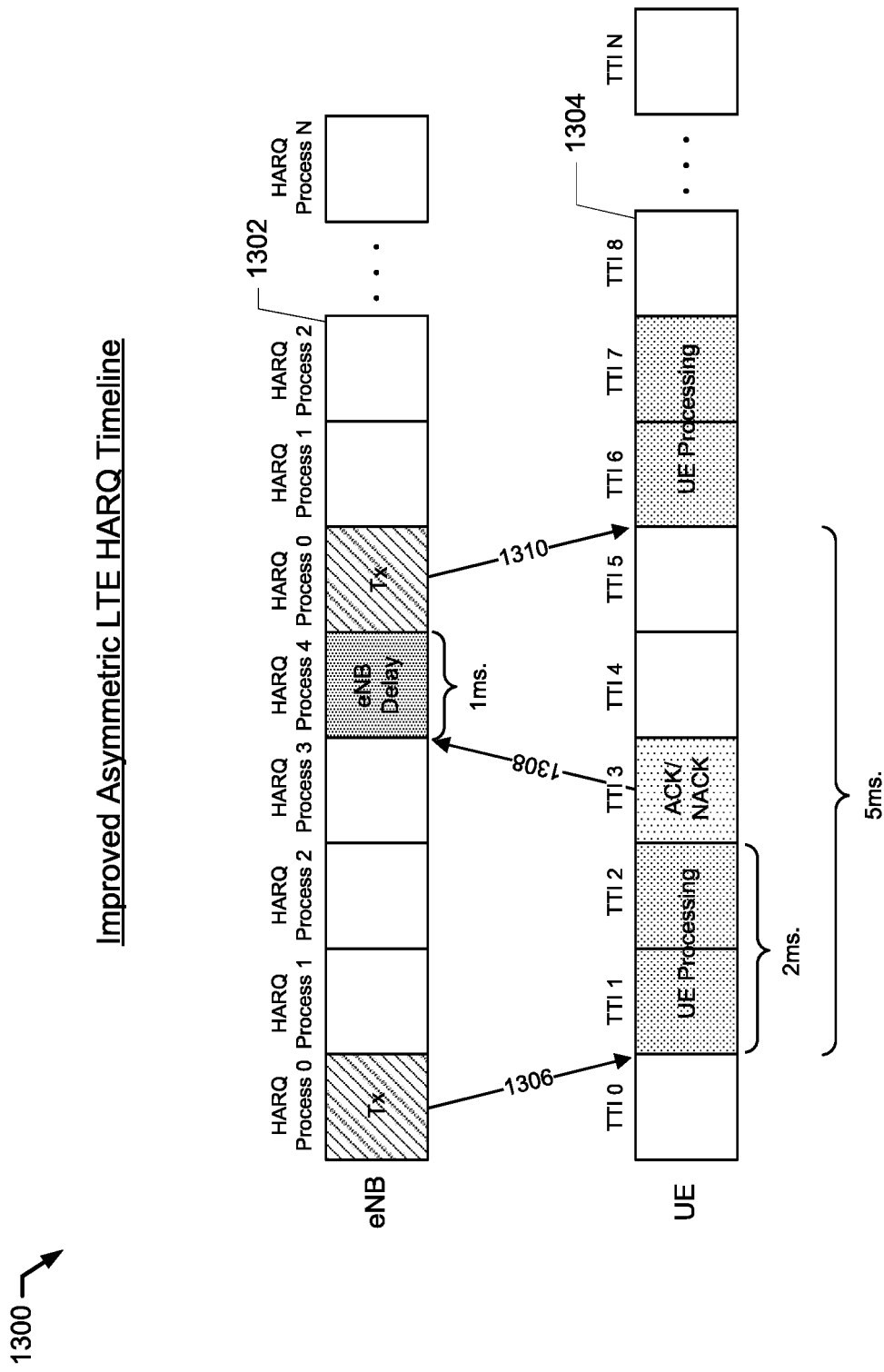
FIG. 13 shows a block diagram depicting an improved asymmetric LTE HARQ processing timeline, in accordance with various embodiments of the disclosure.

FIG. 13 illustrates a simplified block diagram depicting an improved (reduced) asymmetric LTE HARQ processing timeline 1300, in accordance with various implementations of the disclosure. The reduced asymmetric HARQ timeline 1300 represents DL HARQ communications between an eNodeB 1302 and a UE 1304 in accordance with some embodiments. It should be understood, however, that an equivalent reduced asymmetric LTE HARQ timeline representing UL HARQ communications between a UE 400 and a network apparatus 300 could be similarly represented without departing from the spirit and scope of the disclosure. Further, although the simplified block diagram of FIG. 13 shows an asymmetric HARQ timeline 1300 without reference to any SPS or C-DRX procedures, it should be understood that these UE power conservation processes could be included within the context of the asymmetric HARQ timeline 1300.

During an initial HARQ process (HARQ Process 0), the eNodeB 1302 can be configured to transmit DL information 1306 to a UE 1304 during a first TTI (TTI 0). After receiving the DL information from the eNodeB 1302, the UE 1304 can process the received DL transmission over the duration of next two TTIs (from TTI 1 through TTI 2), which is associated with a reduced 2 ms. UE processing delay (with reference to the UE processing delay period of FIG. 7). This DL data processing schedule only requires the UE 1304 to wait until the fourth TTI (TTI 3) to send a HARQ acknowledgement (ACK/NACK) message 1308 to the eNodeB 1302. Upon receipt of the HARQ ACK/NACK message 1308 from the UE 1304, the eNodeB 1302 can process the received DL transmission over the duration of only the next TTI (during TTI 4), in accordance with a network-designated eNodeB 1302 processing delay interval, which is associated with a reduced 1 ms. (asymmetric) eNodeB 1302 processing delay (with reference to the eNodeB 1302 processing delay period of FIG. 7).

Subsequently, at a time associated with the sixth TTI (TTI 5) the eNodeB 1302 can attempt to retransmit a failed DL packet associated with a NACK message 1308 having been received from the UE 1304 at the fourth TTI (TTI 3) or a new packed in case of ACK reception. Notably, in this configuration, the DL HARQ RTT occurs over the course of only 5 TTIs which takes only 5 ms. This RTT designation can be made with consideration of a data type being transmitted to a UE 1304 in the DL.

As described above with respect the synchronous LTE HARQ timeline 700 of FIG. 7, a non-reduced, default network HARQ timeline RTT occurs over the course of 8 TTIs or 8 HARQ processes. This default RTT was originally put in place by the network to give the UE 400 enough time to process all different types of application data occurring in the DL and/or the UL. However, as noted above, VoLTE-type applications do not require this level of processing delay on either the UE 400 or the eNodeB 300 side, because the decoding complexity for VoLTE type data is very low compared to other data types. Accordingly, the network is capable of significantly reducing a HARQ RTT for VoLTE-type data, in the manner described herein with respect to FIGS. 10-13.

When a reduced DL or UL LTE HARQ timeline is employed between collaborating UE 400 and an eNodeB 300, the UE 400 can experience longer periods of inactivity during an RRC Connected mode which may occur with one or more C-DRX operations and/or one or more SPS operations, as described herein. In this configuration, a UE 400 can advantageously power down its RF Circuit 408 to conserve power after having completed a reduced HARQ retransmission in the DL or UL, which can be coordinated between the UE 400 and a corresponding network eNodeB 300.

As would be understood by those skilled in the art, in accordance with the current 3GPP LTE standard specification version (i.e., as of the 3GPP Version: Release 11, having a release date in: Q3 of 2012) LTE DL HARQ is designated as being an asynchronous communication procedure, such that an eNodeB 300 can elect to send a HARQ retransmission at any time it deems appropriate, after receiving a NACK message from a UE 400. Accordingly, in present LTE and LTE-A communications, an eNodeB 300 is required to include the HARQ process number to a UE 400 (e.g., within the PDCCH) to inform the UE 400 where to attempt to decode the PDSCH for the HARQ retransmission data. However, in the UL, LTE HARQ procedures are synchronous, such that a corresponding HARQ retransmission will take place within a predefined delay time period, from the receipt of a DL HARQ NACK message.

For certain types of low bandwidth periodic application data communications (e.g., for VoLTE type application data) it would be beneficial to require DL HARQ procedures to be synchronous, as opposed to remaining asynchronous. In this manner, a UE 400 receiving DL VoLTE-type data communications from an eNodeB 300 will be able to know exactly when to expect a HARQ retransmission. Accordingly, a UE 400 communicating VoLTE application data will be able to conserve battery power by shutting down its RF circuit 408 after sending a positive DL HARQ acknowledgement ACK message to an eNodeB 300. Further, by simultaneously reducing a UE processing delay, as previously discussed, a UE can advantageously receive a downlink HARQ transmission with minimal latency.

Figure 14:
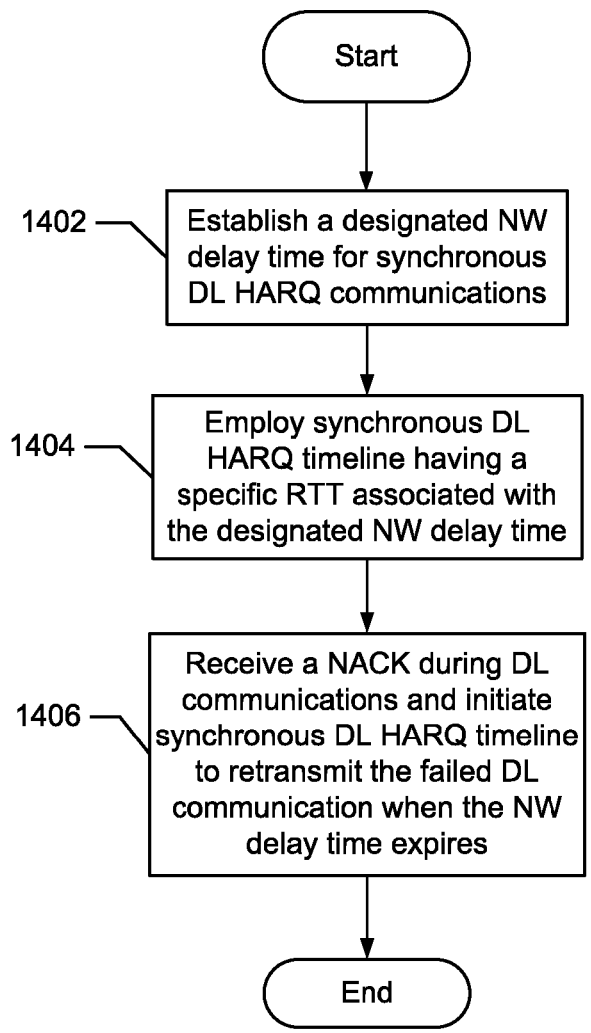
FIG. 14 shows a flowchart associated with example methods for establishing a synchronous HARQ schedule in the DL, in accordance with some implementations of the disclosure.

FIG. 14 illustrates a flowchart associated with various procedures 1400 for establishing a synchronous HARQ schedule in the DL, in accordance with some implementations of the disclosure. It should be understood that any or all of the procedures 1400 depicted in FIG. 14 may be associated with a method, or methods, that can be implemented by the execution of computer program instructions stored on a non-transitory computer-readable memory 306 of an eNodeB 300, and optionally, in conjunction with the execution of computer program instructions stored on a non-transitory computer-readable memory 406 of a UE 400.

Initially, at operation block 1402, an eNodeB 300 can be configured to establish a designated network delay time period in accordance with a synchronous HARQ timeline in the DL. Subsequently, at operation block 1404, the eNodeB 300 can collaborate with a UE 400 to implement the synchronous DL HARQ timeline having a specific RTT associated with the designated network delay. Thereafter, at operation block 1406, the eNodeB 300 can receive a HARQ NACK message from the UE 400 during DL communications, to cause the eNodeB 300 to initiate a synchronous DL HARQ timeline for retransmitting the failed DL transmission after the designated network delay time expires.

In this manner, an eNodeB 300 will not be required to include a HARQ process number to a UE 400 (e.g., within the PDCCH) to inform the UE 400 where to attempt to decode the PDSCH for the DL retransmission data, because the UE 400 will already know when to decode the PDSCH for the DL HARQ retransmission, in accordance with the designated network delay.

As would be understood by those skilled in the art, UEs 400 having LTE communications capability can estimate an effective signal to interference plus noise ratio (SINR) in order determine a modulation and coding scheme (MCS) that allows the UE 400 to receive a DL transmission having a block error rate (BLER) of less than 10%. In this manner, a UE 400 has the capability of predicting a DL BLER for a given MCS. Accordingly, a UE 400 may be configured to map a SINR to a BLER for a given MCS by employing a corresponding lookup table (LUT) for different available MCSs to allow the UE 400 to determine if a given DL transmission is going to fail before the corresponding DL transmission packet is even decoded by the UE 400.

As such, when a UE 400 determines that a particular DL transmission is likely to fail, the UE 400 can preemptively provide predictive NACK feedback to an eNodeB 300 to inform the eNodeB 300 to transmit a DL transmission that is predicted to fail using a higher order MCS. Because the UE 400 will not need to decode a DL transmission that is likely to fail, the UE 400 can go to sleep more frequently than it otherwise would be able to in accordance with a typical HARQ retransmission procedure.

In accordance with various embodiments, for a particular DL subframe, a UE 400 will know the SINR and the MCS after it decodes the PDCCH for control information. In this manner, the UE 400 can determine if a BLER where the DL transmission is likely to fail will be exceeded for a DL transmission of the DL subframe. As such, the UE 400 can generate feedback information to an eNodeB 300 before its turbo decoding of the DL transmission has even finished. For DL retransmissions, the UE 400 can optionally employ a second LUT or it could combine the SINR of the subframes in accordance with the following equation:

$$SINR_{ReTX(i)} = \Sigma_{i=0}^{i} \log(1+SINR_j), \text{ where } i = \text{the subframe where } Tx\ i \text{ occurred} \quad (Eq.\ 1)$$

Figure 15:
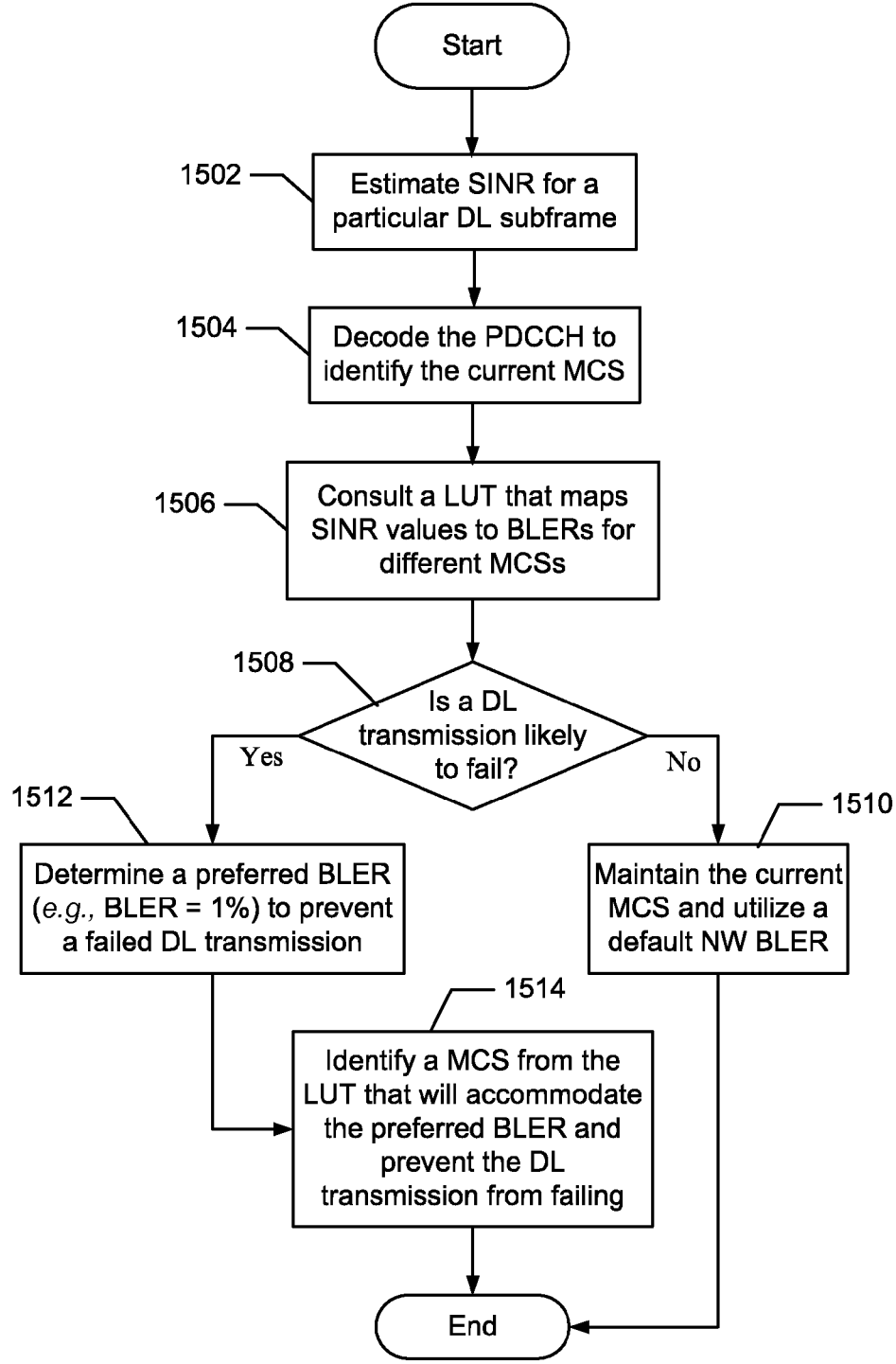
FIG. 15 shows a flowchart associated with example methods for establishing a predictive NACK for HARQ retransmission, in accordance with some embodiments.

FIG. 15 illustrates a flowchart associated with various procedures for establishing predictive NACKs for performing automatic HARQ retransmissions, in accordance with some embodiments. It should be understood that any or all of the procedures 1500 depicted in FIG. 15 may be associated with a method, or methods, that can be implemented by the execution of computer program instructions stored on a non-transitory computer-readable memory 406 of a UE 400, in conjunction with the execution of computer program instructions stored on a non-transitory computer-readable memory 306 of an eNodeB 300.

By way of example, at operation block 1502, a UE 400 can estimate an SINR in the manner described above, for a particular DL subframe. Subsequently, at operation block 1504, the UE 400 can decode the PDCCH to identify a current MCS for the DL subframe. Next, at operation block 1506, the UE 400 can consult a predictive NACK LUT to map the estimated SINR value to the BLER failure level (e.g., a BLER of 10%) for different available MCSs. Then, at decision block 1508, the UE 400 can determine if a DL transmission of the DL subframe is likely to fail.

In a scenario where the DL transmission is likely to fail according the BLER failure level, at operation block 1512, the UE 400 and/or an eNodeB 300 can determine a preferred BLER (e.g., a BLER of 1%) to prevent a DL transmission of the DL subframe from failing. Alternatively, the preferred BLER may be known in advance by the UE 400 and/or the eNodeB 300 according to a network specification. By way of example, for Release 99 (R99) UMTS voice systems a BLER of 1% is utilized to prevent communications failure. In a similar manner, by employing a reduced BLER for VoLTE voice communications HARQ procedures can be completely removed.

Subsequently, at operation block 1514, the UE 400 and/or the eNodeB 300 can consult the LUT to identify a MCS that will accommodate the preferred BLER (e.g., a BLER of 1%) and prevent the DL transmission of the DL subframe from failing. Alternatively, when it is determined that a DL transmission of the DL subframe is not likely to fail, at operation block 1510, the eNodeB 300 can maintain a current MCS level for the DL transmission at the default network-designated BLER. However, it should be understood that by requiring a reduced BLER (e.g., a BLER of 1%) within a network during VoLTE communications, HARQ procedures may be effectively negated/removed, and as such, a UE 400 will not need waste valuable device resources (e.g., battery power) to monitor the PHICH or decode the PUCCH for HARQ messaging. This benefit can be achieved, as the UE 400 will have successfully acquired the DL packet at the first transmission. Therefore, no HARQ retransmissions would be necessary.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium.

The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method comprising:
by a user equipment (UE) device:
sending, to a base station, a first message indicating that the UE device can perform a reduced hybrid automatic repeat request (HARQ) timeline;
receiving, from the base station, a second message comprising a reduced HARQ timeline configuration, wherein the reduced HARQ timeline configuration reduces interruption to a sleep mode of the UE;
receiving, from the base station, a first data transmission during a first subframe;
generating feedback information for the base station, wherein the feedback information comprises a likelihood that a decoding of the first data transmission is likely to fail; and
transmitting, to the base station and based on the feedback information and the reduced HARQ timeline configuration, a second message during a second subframe, wherein the second message comprises: i) an acknowledgement (ACK) message corresponding to the first data transmission, or ii) a negative acknowledgement (NACK) message corresponding to the first data transmission,
wherein the transmitting occurs before the decoding of the first data transmission has finished.

2. The method of claim 1, wherein the first data transmission comprises a retransmission.

3. The method of claim 2, wherein the feedback information is based on a first signal to interference plus noise ratio (SINR) corresponding to the first subframe and a second SINR corresponding to another subframe.

4. The method of claim 3, wherein the generating comprises using a lookup table (LUT), wherein an output of the LUT is the likelihood that the decoding of the first data transmission is likely to fail.

5. The method of claim 1, wherein the second message is an ACK message.

6. The method of claim 5, further comprising:
receiving a third message from the base station, wherein the third message comprises a connected mode discontinuous reception (C-DRX) configuration or a semi-persistent signaling (SPS) configuration; and
shutting down a radio frequency (RF) circuit of the UE device, based on the C-DRX configuration or the SPS configuration, after transmitting the ACK message.

7. The method of claim 1, wherein the second message is a NACK message.

8. The method of claim 7, further comprising:
receiving a third message from the base station, wherein the third message comprises a connected mode discontinuous reception (C-DRX) configuration or a semi-persistent signaling (SPS) configuration; and
shutting down a radio frequency (RF) circuit, based on the C-DRX configuration or the SPS configuration, after transmitting the NACK message, wherein the UE device is configured to receive a retransmission of the first data transmission from the base station at a particular subframe subsequent to the second subframe, wherein a position of the particular subframe in time is based on a synchronous downlink operation.

9. A user equipment (UE) device comprising:
one or more processors; and
a computer-readable apparatus having a storage medium with executable instructions stored thereon that, when executed by the one or more processors, cause the UE device to:
send, to a base station, a first message indicating that the UE device can perform a reduced hybrid automatic repeat request (HARQ) timeline;
receive, from the base station, a second message comprising a reduced HARQ timeline configuration, wherein the reduced HARQ timeline configuration reduces interruption to a sleep mode of the UE;
receive, from the base station, a first data transmission during a first subframe;
generate feedback information for the base station, wherein the feedback information comprises a likelihood that a decoding of the first data transmission is likely to fail; and
transmit, to the base station and based on the feedback information and the reduced HARQ timeline configuration, a second message during a second subframe, wherein the second message comprises: i) an acknowledgement (ACK) message corresponding to the first data transmission, or ii) a negative acknowledgement (NACK) message corresponding to the first data transmission,
wherein execution of the executable instructions by the one or more processors causes the UE device to transmit the second message before the UE device has finished the decoding of the first data transmission.

10. The UE device of claim 9, wherein the first data transmission comprises a retransmission.

11. The UE device of claim 10, wherein the feedback information is based on a first signal to interference plus noise ratio (SINR) corresponding to the first subframe and a second SINR corresponding to another subframe.

12. The UE device of claim 11, wherein execution of the executable instructions by the one or more processors further causes the UE device to generate the feedback information using a lookup table (LUT), wherein an output of the LUT is the likelihood that the decoding of the first data transmission is likely to fail.

13. The UE device of claim 9, further comprising:
receiving a third message from the base station, wherein the third message comprises a connected mode discontinuous reception (C-DRX) configuration or a semi-persistent signaling (SPS) configuration; and shutting down a radio frequency (RF) circuit of the UE device, based on the C-DRX configuration or the SPS configuration, after transmitting the second message, wherein the second message is an ACK message.

14. A non-transitory computer-readable storage medium with executable instructions stored thereon that, when executed by one or more processors, cause a user equipment (UE) device to:
   send, to a base station, a first message indicating that the UE device can perform a reduced hybrid automatic repeat request (HARQ) timeline;
   receive, from the base station, a second message comprising a reduced HARQ timeline configuration, wherein the reduced HARQ timeline configuration reduces interruption to a sleep mode of the UE;
   receive, from the base station, a first data transmission during a first subframe;
   generate feedback information for the base station, wherein the feedback information comprises a likelihood that a decoding of the first data transmission is likely to fail; and
   transmit, to the base station and based on the feedback information and the reduced HARQ timeline configuration, a second message during a second subframe, wherein the second message comprises: i) an acknowledgement (ACK) message corresponding to the first data transmission, or ii) a negative acknowledgement (NACK) message corresponding to the first data transmission,
   wherein execution of the executable instructions by the one or more processors causes the UE device to transmit the second message before the UE device has finished the decoding of the first data transmission.

15. The non-transitory computer-readable storage medium of claim 14, wherein the first data transmission comprises a retransmission.

16. The non-transitory computer-readable storage medium of claim 15, wherein the feedback information is based on a first signal to interference plus noise ratio (SINR) corresponding to the first subframe and a second SINR corresponding to another subframe.

17. The non-transitory computer-readable storage medium of claim 15, wherein execution of the executable instructions by the one or more processors further causes the UE device to generate the feedback information using a lookup table (LUT), wherein an output of the LUT is the likelihood that the decoding of the first data transmission is likely to fail.

18. The method of claim 1, wherein the NACK message comprises a predictive NACK message informing the base station to transmit with a higher order modulation and coding scheme (MCS).

19. The UE device of claim 9, wherein the NACK message comprises a predictive NACK message configured to inform the base station to transmit with a higher order modulation and coding scheme (MCS).

20. The non-transitory computer-readable storage medium of claim 14, wherein the NACK message comprises a predictive NACK message configured to inform the base station to transmit with a higher order modulation and coding scheme (MCS).

* * * * *